(12) United States Patent
 Chung

(10) Patent No.: US 10,613,679 B2
(45) Date of Patent: Apr. 7, 2020

(54) TOUCH DRIVING CIRCUIT, TOUCH DISPLAY DEVICE, AND PEN DATA RECOGNITION METHOD BY TOUCH CIRCUIT

(71) Applicant: LG DISPLAY CO., LTD., Seoul (KR)

(72) Inventor: JuneGun Chung, Yongin-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/222,225

(22) Filed: Dec. 17, 2018

(65) Prior Publication Data

US 2019/0196644 A1    Jun. 27, 2019

(51) Int. Cl.
 *G06F 3/041* (2006.01)
 *G06F 3/044* (2006.01)

(52) U.S. Cl.
 CPC ............ *G06F 3/0416* (2013.01); *G06F 3/044* (2013.01); *G06F 3/0442* (2019.05); *G06F 3/0443* (2019.05); *G06F 3/04162* (2019.05); *G06F 3/04182* (2019.05); *G06F 3/041661* (2019.05); *G06F 3/0412* (2013.01); *G06F 3/04184* (2019.05); *G06F 2203/04114* (2019.05)

(58) Field of Classification Search
 CPC ...... G06F 3/0416; G06F 3/0443; G06F 3/044; G06F 3/0412; G06F 3/04184; G06F 3/04182; G06F 3/04162; G06F 3/0442; G06F 2203/04114; G06F 3/041661
 See application file for complete search history.

(56) References Cited

U.S. PATENT DOCUMENTS

| 9,898,128 B2 * | 2/2018 | Oda ...................... G06F 3/0416 |
| 2015/0109263 A1 * | 4/2015 | Hargreaves ......... G06F 3/03545 345/179 |

* cited by examiner

*Primary Examiner* — Muhammad N Edun
(74) *Attorney, Agent, or Firm* — Polsinelli PC

(57) ABSTRACT

The present disclosure provides a touch driving circuit, a touch display device, and a pen data recognition method by a touch circuit, and the touch circuit supplies a touch driving signal to two or more touch electrodes from among the plurality of touch electrodes in a pen data mode, generates sensing data for recognizing pen data which is transmitted from an active pen via the two or more touch electrodes in response to the touch driving signal, and performs range conversion and merger of two or more pieces of sensing data generated by detecting the pen data of same bit value, so as to generate summation sensing data.

16 Claims, 17 Drawing Sheets

FIG.3

| LHB | 1 | 2 | 3 | 4 | 5 | 6 | 7 | 8 | 9 | 10 | 11 | 12 | 13 | 14 | 16 | 16 |
|---|---|---|---|---|---|---|---|---|---|---|---|---|---|---|---|---|
| Panel | Beacon | Pen1 | Data1 | Finger1 | Pen2 | Data2 | Data3 | Finger2 | Pen3 | Data4 | Data5 | Finger3 | Pen4 | Data6 | Data7 | Finger4 |

FIG.10 buf1

| [0,0] | [0,1] | [0,2] | [0,3] | [0,4] | [0,5] | [0,6] | [0,7] |
|---|---|---|---|---|---|---|---|
| [1,0] | [1,1] | [1,2] | [1,3] | [1,4] | [1,5] | [1,6] | [1,7] |
| [2,0] | [2,1] | [2,2] | [2,3] | [2,4] | [2,5] | [2,6] | [2,7] |
| [3,0] | [3,1] | [3,2] | [3,3] | [3,4] | [3,5] | [3,6] | [3,7] |

Ex1)

1011000 (7bit, Bit value = 1)

+ = 10101011 (8bit, Bit value = 1)

1011000 (7bit, Bit value = 1)

Ex2)

0001000 (7bit, Bit value = 0)

+ = 00001101 (8bit, Bit value = 0)

0000101 (7bit, Bit value = 0)

FIG.14

| [0,0]+[1,0] | [0,1]+[1,1] | [0,2]+[1,2] | [0,3]+[1,3] | [0,4]+[1,4] | [0,5]+[1,5] | [0,6]+[1,6] | [0,7]+[1,7] |  |  |
| --- | --- | --- | --- | --- | --- | --- | --- | --- | --- |
| [2,0]+[3,0] | [2,1]+[3,1] | [2,2]+[3,2] | [2,3]+[3,3] | [2,4]+[3,4] | [2,5]+[3,5] | [2,6]+[3,6] | [2,7]+[3,7] |  |  |
|  |  |  |  |  |  |  |  |  |  | buf1

TOUCH DRIVING CIRCUIT, TOUCH DISPLAY DEVICE, AND PEN DATA RECOGNITION METHOD BY TOUCH CIRCUIT

CROSS REFERENCE TO RELATED APPLICATION

This application claims priority from Korean Patent Application No. 10-2017-0181178, filed on Dec. 27, 2017, which is hereby incorporated by reference for all purposes as if fully set forth herein.

BACKGROUND

Field of the Disclosure

The present disclosure relates to a touch driving circuit, a touch display device, and a pen data recognition method by a touch circuit.

Description of the Background

With the development of the information society, touch display devices for displaying images are being increasingly required in various forms, and various types of display devices, such as liquid crystal display (LCD) devices, plasma display panels (PDP), and organic light emitting diode display (OLED) devices, are utilized.

Among the display devices, there is a touch display device which provides a touch-based input method such that a user easily and intuitively inputs information or commands, beyond the typical input method such as a button, a keyboard, a mouse, or the like.

To provide the touch-based input method, the touch display device needs to recognize whether a user performs a touch, and needs to accurately detect a touch coordinate (touch location).

Also, as demands for an elaborate pen touch input increase, a pen touch technology is being developed, as well as a finger touch, or the like.

The display device needs to accurately and promptly recognize information associated with a pen in order to provide a function interoperating with a pen.

Recently, since the number of the functions interworking with a pen increases and the functions become complicated, the amount of pen information transmitted from the pen to the display device also increase.

However, it takes a significantly long time to transmit various types of, and a large amount of, pen information due to the characteristics of pen output signals, or the various types of, and a large amount of, pen information may not be transmitted within the limited period of time, which is a drawback. Therefore, the pen information may not be recognized or may be recognized late, whereby a pen touch technology or a function interoperating with a pen may not be provided normally.

In addition, as the resolution and the size of a touch display device increases, it is difficult for the touch display device to reliably process data transmitted from a pen within a designated touch period.

SUMMARY

In this background, an aspect of the present disclosure is to provide a touch driving circuit, a touch display device, and a pen data recognition method by a touch circuit, which may reduce the amount of sensing data for recognizing pen data, in order to efficiently transmit the sensing data.

Another aspect of the present disclosure is to provide a touch driving circuit, a touch display device, and a pen data recognition method by a touch circuit, which may receive pen data without changing a touch controller even though the number of touch driving circuits increases.

Another aspect of the present disclosure is to provide a touch driving circuit, a touch display device, and a pen data recognition method by a touch circuit, which may transmit sensing data for recognizing pen data with a narrow bandwidth.

In an accordance with an aspect of the present disclosure, there is provided a touch display device, the touch display device including: a touch panel on which a plurality of touch electrodes are disposed; and a touch circuit configured to: supply a touch driving signal to two or more touch electrodes from among the plurality of touch electrodes in a pen data mode; generate sensing data for recognizing pen data which is transmitted from an active pen via the two or more touch electrodes in response to the touch driving signal; and perform range conversion and merger of two or more pieces of sensing data generated by detecting the pen data of same bit value, so as to generate summation sensing data.

Here, the number of bits of the summation sensing data is less than or equal to the number of bits of each piece of sensing data in the two or more pieces of sensing data.

The sensing data may be obtained by performing digital conversion of a sensing signal into data of a predetermined number of bits, wherein the sensing signal is generated by detecting each bit of the pen data sequentially output from the active pen via two or more touch electrodes in response to the touch driving signal.

The summation sensing data may be generated by performing range conversion that removes a predetermined lower bit of each of two or more pieces of sensing data as far as determination of each bit value of the pen data is allowed, and by merging the two or more pieces of range-converted sensing data.

The summation sensing data may be generated by performing binary summation of the two or more pieces of range-converted sensing data.

The touch circuit includes: two or more touch driving circuits configured to supply the touch driving signal to the touch panel, and to obtain and output the summation sensing data; and a touch controller configured to: generate the touch driving signal, transmit the touch driving signal to at least one touch driving circuit, determine a position of the active pen in a pen position mode that is executed before the pen data mode so as to transmit pen position data to the touch driving circuit; receive the summation sensing data, and determine the pen data.

The touch driving circuit includes: a first switch including a plurality of first multiplexers for selecting two or more touch electrodes to which the touch driving signal is to be supplied, from among the plurality of touch electrodes; a sensing converter including a plurality of sensing units for supplying the touch driving signal to two or more touch electrodes selected by a corresponding first multiplexer from among the plurality of first multiplexers, and detecting each bit of the pen data received via the touch electrodes to which the touch driving signal is supplied, so as to generate the sensing signal; a second switch including at least one second multiplexer for selecting at least one sensing unit from among the plurality of sensing units; an AD converter including at least one analog-digital converter for converting the sensing signal received via the second switch into a digital signal, and for outputting the sensing data; a sensing buffer including at least one buffer that stores the summation sensing data; a timing generator configured to: control the first and second switches based on the pen position data transmitted from the touch controller; control an operation timing of the AD converter; receive the sensing data so as to generate the summation sensing data; and control a timing for outputting the summation sensing data; and a slave interface configured to communicate with the touch controller in a designated manner, according to control of the timing generator.

The timing generator includes: a range converter configured to range-convert the sensing data output from the AD converter, and to output the converted sensing data; a channel delayer configured to delay the converted sensing data, based on a channel counting value associated with a touch electrode from which the sensing data is detected; a data merger unit configured to merge converted sensing data output from the range converter and converted sensing data delayed by the channel delayer, and to output summation sensing data; a summation data select switch configured to select and output one from among converted sensing data output from the range converter and summation sensing data output from the data merger unit in response to a merger signal; and a merger controller configured to output the merger signal, based on a configuration value stored in advance in the pen data mode.

The timing generator is configured to: obtain the summation sensing data from sensing data associated with touch electrodes close to each other from among the two or more selected touch electrodes; and sequentially store the obtained summation sensing data in a location in the sensing buffer, the location corresponding to locations of the touch electrodes.

The timing generator is configured to: control the slave interface to output an interrupt signal when the amount of data of the stored summation sensing data is a predetermined amount of data transmission.

The touch controller may include at least one master interface configured to communicate with the slave interface.

The master interface is configured to receive the summation sensing data stored in the sensing buffer when the interrupt signal is received.

Each of the at least one master interface is configured to communicate with two or more slave interfaces when the number of the at least one master interface installed in the touch controller is smaller than the number of touch driving circuits.

In accordance with another aspect of the present disclosure, there is provided a touch driving circuit, including: a sensing converter configured to supply a touch driving signal to two or more touch electrodes from among a plurality of touch electrodes in a pen data mode, and to generate sensing data for recognizing pen data transmitted from an active pen via the two or more touch electrodes in response to the touch driving signal; and a timing generator configured to control the sensing converter, and to generate summation sensing data by processing and merging two or more pieces of sensing data generated by detecting the pen data of same bit value.

In accordance with another aspect of the present disclosure, there is provided a method of recognizing pen data by a touch circuit, the method including: supplying a touch driving signal to two or more touch electrodes from among a plurality of touch electrodes in a pen data mode, and performing driving; generating sensing data for recognizing pen data transmitted from an active pen via the two or more touch electrodes in response to the touch driving signal; generating summation sensing data by performing range-conversion and merger of two or more pieces of sensing data generated by detecting the pen data of same bit value; and determining each bit value of the pen data, based on the summation sensing data.

According to aspects of the present disclosure, there are provided a touch driving circuit, a touch display device, and a pen data recognition method by a touch circuit, which reduce the amount of data of sensing data for recognizing pen data so as to efficiently transmit sensing data.

According to aspects of the present disclosure, there are provided a touch driving circuit, a touch display device, and a pen data recognition method by a touch circuit, which may receive pen data without changing a touch controller even though the number of touch driving circuits increases.

According to aspects of the present disclosure, there are provided a touch driving circuit, a touch display device, and a pen data recognition method by a touch circuit, which may transmit sensing data for recognizing pen data with a narrow bandwidth.

BRIEF DESCRIPTION OF THE DRAWINGS

The above and other aspects, features and advantages of the present disclosure will be more apparent from the following detailed description taken in conjunction with the accompanying drawings, in which:

FIG. 3 is a diagram illustrating an example of the configuration of an LHB in a pen mode according to aspects of the present disclosure;

FIG. 10 is a diagram illustrating sensing data stored in a buffer of a sensing buffer;

FIG. 14 is a diagram illustrating sensing data stored in a buffer of a sensing buffer;

DETAILED DESCRIPTION

Figure 1:
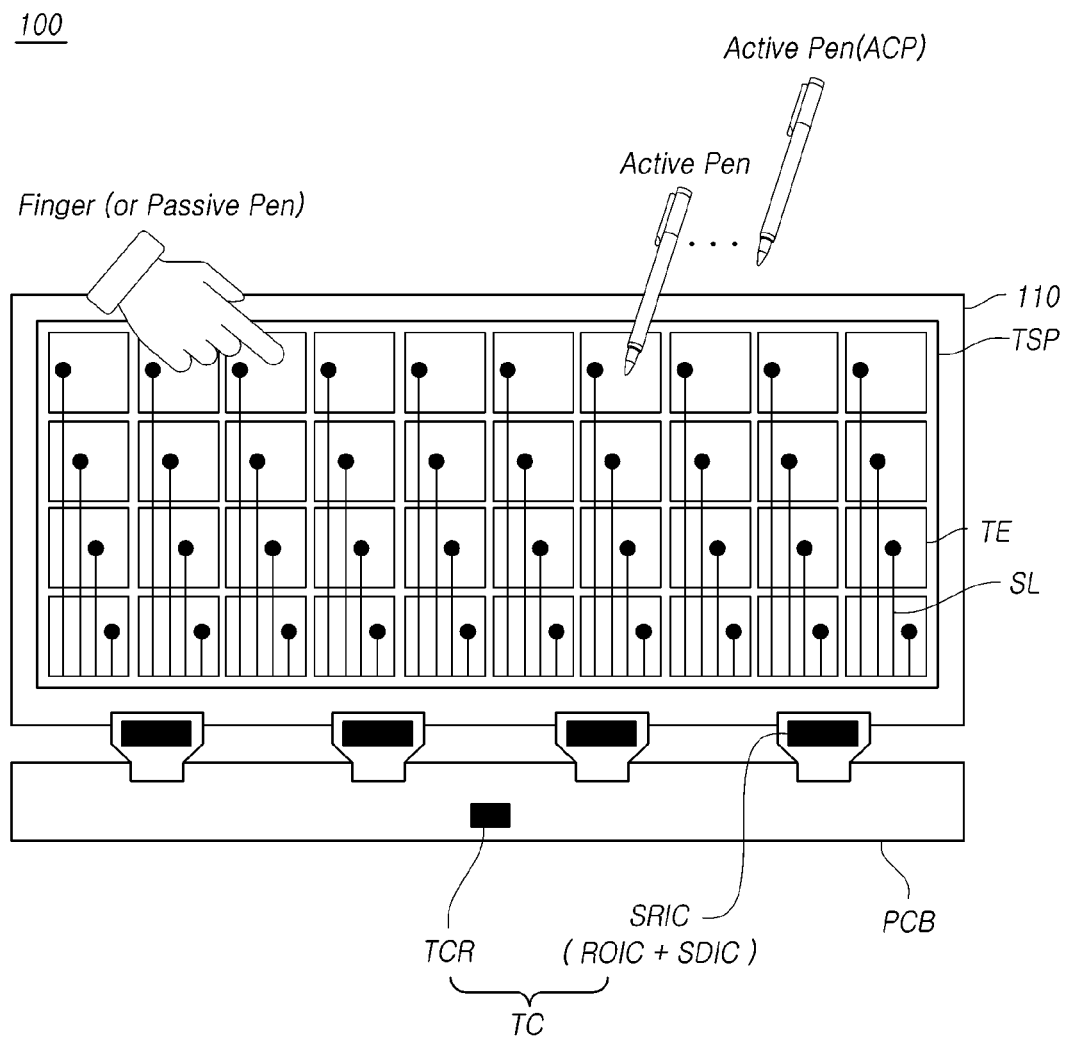
FIG. 1 is a diagram illustrating a touch display device 100 according to aspects of the present disclosure.

Hereinafter, exemplary aspects of the present disclosure will be described in detail with reference to the accompanying drawings. In assigning reference numerals to elements in the drawings, the same reference numerals will designate the same elements where possible although they are shown in different drawings. Also, in the following description of the present disclosure, a detailed description of known functions and configurations incorporated herein will be omitted when it may make the subject matter of the present disclosure rather unclear.

In addition, such terms as "first", "second", "A", "B", "(a)", "(b)", and the like, may be used herein when describing elements of the present disclosure. These terms are merely used to distinguish one element from other elements, and the essence of a corresponding element, an order thereof, a sequence thereof, and the number of the corresponding elements are not limited by the terms. When an element is described as being "connected", "coupled", or "linked" to another element, it will be understood that the element may not only be directly connected or coupled to said another element, but may also be "connected", "coupled", or "linked" to said another element through a third element, or the third element may also be interposed between the element and said another element.

FIG. 1 illustrates a touch display device 100 according to aspects of the present disclosure.

Referring to FIG. 1, the touch display device 100 according to the aspects may be a display device that may provide a touch sensing function that senses a passive touch input pointer, such as a finger or the like, and a pen touch sensing function (pen recognition function) that senses an active pen (ACP) corresponding to an active touch input, in addition to an image display function.

In the aspects of the present disclosure, the active pen (ACP) may indicate a pen, which has a signal transmission/reception function, performs an operation interoperating with the touch display device 100, and includes a self-power source. The active pen may be referred to as a stylus, a stylus pen, an active stylus pen, or the like. A normal pen may indicate a pen, which does not include a signal transmission/reception function, does not perform an operation interoperating with the touch display device 100, and does not include a self-power source. For ease of description, the active pen (ACP) may be simply referred to as "pen" throughout the present specification.

The active pen (ACP) is an active touch input tool that has a function of transmitting and receiving a signal to/from the touch display device 100, and a finger, a normal pen, or the like is a normal touch input tool that does not have a function of transmitting and receiving a signal to/from the touch display device 100.

Hereinafter, for ease of description, a finger is representatively used as a normal touch input tool. However, "finger" used in the following description should be understood as a meaning including all normal touch input tools such as a normal pen or the like.

The touch display device 100 according to the present aspects is a display device having a touch panel (TSP) in which a plurality of touch electrodes (TE) are disposed, wherein the touch electrodes act as touch sensors for touch sensing. The touch display device 100 may be a television (TV), a monitor, or the like, or may be a mobile device such as a tablet, a smart phone, or the like.

The touch panel (TSP) may be manufactured as a separate entity from the display panel 110 and may be bonded to the display panel 110, or may be embedded in the display panel 110. Hereinafter, for ease of description, a description will be provided by assuming that a touch panel (TSP) is implemented to be embedded in the display panel 110, and the display panel 110 and the touch panel (TSP) are not distinguished separately.

When the touch panel (TSP) is embedded in the display panel 110, the touch panel (TSP) may be considered to be an aggregate of a plurality of touch electrodes (TEs) and a plurality of signal lines (SLs).

The plurality of touch electrodes (TEs) may be touch electrodes for a self-capacitance sensing scheme. Depending on a case, the plurality of touch electrodes (TEs) may be touch electrodes for a mutual-capacitance sensing scheme.

When the plurality of touch electrodes (TEs) are embedded in the display panel 110, the plurality of touch electrodes (TEs) may be disposed in a manner of an in-cell type or an on-cell type, and the plurality of touch electrodes (TEs) may be manufactured when the display panel 110 is manufactured.

The display panel 110 may be one of the various types of panels such as a liquid crystal display panel, an organic light emitting display panel, and the like.

For example, when the display panel 110 is a liquid crystal display panel, the touch display device 100 may divide a common electrode, which is provided with a common voltage (Vcom) and forms an electric field with a pixel electrode, into a plurality of blocks, and may use the plurality of blocks as a plurality of touch electrodes (TEs).

As another example, when the display panel 110 is an organic light emitting display panel, the touch display device 100 may include a plurality of touch electrodes (TEs), which are disposed in a touch sensor metal layer, wherein the touch sensor metal layer is disposed in an encapsulation layer, and the encapsulation layer has an encapsulation function and is disposed on a first electrode, an organic light emitting layer, and a second electrode which form an organic light emitting diode (OLED).

Also, for ease of description, a descriptions will be provided by assuming that a plurality of touch electrodes (TEs) are used as touch driving electrodes (touch sensors) in the case of touch driving, and the plurality of touch electrodes (TEs) are used as a common electrode (Vcom electrode) in the case of display driving.

The touch display device 100 may include a touch circuit (TC) that performs touch sensing and pen-touch sensing based on a signal that is received via the touch panel (TSP) (also referred to as a touch screen panel) by driving the touch panel (TSP).

The touch circuit (TC) may include at least one first circuit that receives a signal via a touch panel (TSP) by driving the touch panel (TSP), and at least one second circuit that performs touch sensing (finger touch sensing) and pen touch sensing (pen recognition processing) using a signal that the at least one first circuit receives via the touch panel (TSP).

The first circuit is referred to as a touch driving circuit (ROIC) and the second circuit is referred to as a touch controller (TCR).

As illustrated in FIG. 1, each touch driving circuit (ROIC) and a data driving circuit (SDIC) that drives data lines are implemented as an integrated driving chip (SRIC).

The integrated driving chip (SRIC) may be installed on a film, which is a chip on film (COF) type.

The film on which the integrated driving chip (SRIC) is installed may be bonded to a bonder of the display panel 110 and a bonder of a printed circuit board (PCB).

In the printed circuit board (PCB), a touch controller (TCR) or the like may be installed.

The touch driving circuit (ROIC) and the data driving circuit (SDIC) may be implemented as separate driving chips. The touch driving circuit (ROIC) may be electrically connected via a plurality of touch electrodes (TEs) and a plurality of signal lines (SLs) included in the touch panel (TSP).

The touch circuit (TC) and the touch panel (TSP) together may be referred to as a touch sensing system.

Figure 2:
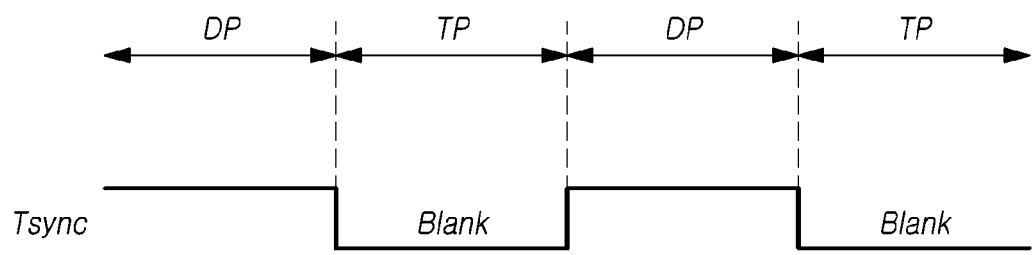
FIG. 2 is a diagram illustrating timings of a display period and a touch period of a touch display device according to aspects of the present disclosure.

FIG. 2 is a diagram illustrating timings of a display period and a touch period of a touch display device according to various aspects.

Referring to FIG. 2, the touch display device 100 according to various aspects may perform display driving for displaying an image during a predetermined display period (DP), and may perform touch driving for sensing a touch input provided by a finger and/or an active pen (ACP) during a predetermined touch period (TP).

The display period (DP) and the touch period (TP) may be the same period or an overlapping period, or may be separate periods from the perspective of time.

Hereinafter, a description will be provided based on the case in which a display period (DP) and a touch period (TP) are separate periods from the perspective of time.

In this instance, the display period (DP) and the touch period (TP) may be alternated.

When the display period (DP) and the touch period (TP) are alternated and are separate from the perspective of time, the touch period (TP) may be a blank period in which display driving is not performed.

The touch display device 100 may generate a synchronization signal (Tsync) that swings between a high level and a low level, so as to identify or control the display period (DP) and the touch period (TP).

For example, the high level period (or low level period) of the synchronization signal (Tsync) may correspond to the display period (DP), and the low level period (or high level period) of the synchronization signal (Tsync) may correspond to the touch period (TP).

As an example of a scheme of allocating a display period (DP) and a touch period (TP) within a single frame time, a single frame time is time-divided into a single display period (DP) and a single touch period (TP), and display driving is performed during the single display period (DP), and touch driving for sensing a data input or a touch by a finger and/or an active pen (ACP) may be performed during the single touch period (TP) corresponding to a blank period.

As another example, a single frame time may be time-divided into two or more display periods (DPs) and two or more touch periods (TPs). Display driving for a single frame may be performed during the two or more display periods (DPs) in a single frame time. During two or more touch periods (TPs) corresponding to the blank period of the single frame time, touch driving may be performed for sensing, once or at least two times, a touch input by a finger and/or an active pen (ACP) on the entirety of a screen. Alternatively, touch driving may be performed for sensing a touch input by a finger and/or an active pen (ACP) on a partial area of the screen.

When a single frame time is time-divided into two or more display periods (DPs) and two or more touch periods (TPs), each of the two or more blank periods corresponding to the two or more touch periods (TPs) in the single frame time may be referred to as a "long horizontal blank (LHB)".

Here, touch driving performed during two or more LHBs in a single frame time may be referred to as "LHB driving".

FIG. 3 is a diagram illustrating an example of the configuration of an LHB in a pen mode according to aspects of the present disclosure.

As illustrated in FIG. 3, a single frame time may be time-divided into, for example, 16 display periods (DPs) and 16 touch periods (TPs).

In this instance, 16 touch periods (TPs) may correspond to 16 LHBs.

The touch display device 100 that interoperates with an active pen (ACP) may operate briefly in two modes, that is, a pen searching mode and a pen mode, during a touch period of each frame. That is, each of the pen searching mode and the pen mode may include 16 LHBs.

Here, the pen searching mode is a mode for determining whether an active pen exists and the position of the active pen. The pen mode is a mode for receiving, from the active pen, the position of the active pen, the tilt of the active pen, various types of pen data, and the like.

Here, the various types of pen data may include, for example, at least one from among the pressure of a pen (pressure), pen button input information, pen identification information (pen ID), and the like.

In the pen mode, for recognition processing associated with an active pen (ACP), a detailed operation mode for each LHB may be set as illustrated in FIG. 3.

Referring to FIG. 3, at least one LHB in a single frame time may be designated to be in a beacon mode that transmits a beacon signal from a touch panel (TSP) to the pen (ACP).

At least one LHB may be designated to be in a finger mode for sensing a touch object (a passive touch input pointer, for example, a finger, a normal touch pen, or the like) which is different from the active pen.

Also, a plurality of LHBs may be designated to be in one of a pen position mode and a pen data mode, wherein the pen position mode is for sensing the position of the active pen, and the pen data mode is for receiving data transmitted from the active pen.

In this instance, in a touch circuit (TC), the pen position mode is performed for recognition processing associated with the active pen (ACP), and after the position of the active pen (ACP) is identified, the pen data mode is performed, as illustrated in FIG. 3.

That is, the touch circuit (TC) may identify the position of the active pen (ACP) before receiving pen data, and may receive pen data via a touch electrode (TE) corresponding to the identified position of the pen (ACP).

Figure 4:
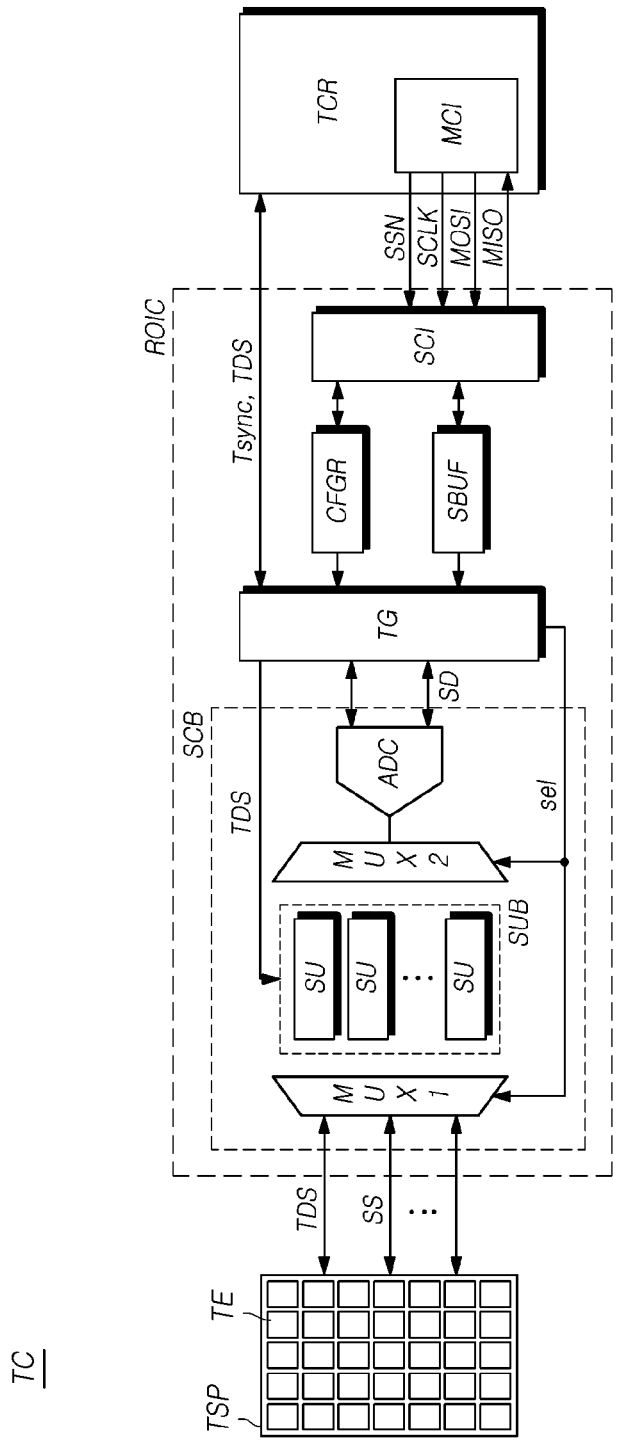
FIG. 4 is a diagram illustrating a schematic structure of a touch circuit (TC) according to aspects of the present disclosure.

FIG. 4 is a diagram illustrating a schematic structure of a touch circuit (TC) according to aspects of the present disclosure.

As described above, the touch circuit (TC) may include at least one touch driving circuit (ROIC) and a touch controller (TCR).

Here, the at least one touch driving circuit (ROIC) outputs a touch driving signal (TDS) to two or more touch electrodes (TEs), converts, into sensing data (SD), a sensing signal (SS) detected via each touch electrode (TE) to which the touch driving signal (TDS) is provided, and transmits the converted sensing data to the touch controller (TCR).

Particularly, in the pen data mode, the touch driving circuit (ROIC) according to aspects of the present disclosure may generate sensing data for recognizing pen data transmitted from the active pen (ACP) via two or more touch electrodes (TEs) in response to the touch driving signal (TDS), and may range-convert and merge two or more pieces of sensing data generated by detecting the pen data of same bit value, so as to generate summation sensing data.

Here, the number of bits of the summation sensing data may be controlled to be less than or equal to the number of bits of each piece of sensing data. For example, when two pieces of 8-bit sensing data are merged, the summation sensing data may be controlled to have 8 or fewer bits. Therefore, the total amount of data may be reduced by ½ or less than ½.

In the finger mode or the pen position mode, the touch controller (TCR) may receive sensing data, and may detect, based on the sensing data, whether a touch exists and/or may detect touch information associated with the position of a touch.

Also, in the pen data mode, the touch controller (TCR) may receive summation sensing data, and may detect pen data transmitted from the active pen (ACP).

The touch driving circuit (ROIC) may include a sensing converter (SCB) for touch sensing processing and analog-digital converting, and a timing generator (TG) for controlling the sensing converter (SCB), and generating summation sensing data by processing and merging two or more pieces of sensing data generated by detecting the pen data of same bit value.

Also, the touch driving circuit (ROIC) may include a slave interface (SCI) for transmitting and receiving data by communicating with the touch controller (TCR) in a predetermined manner, and a sensing buffer (SBUF) for storing summation sensing data and sensing data to be transmitted to the touch controller (TCR).

In the present specification, the touch sensing processing, which indicates sensing processing associated with a touch panel (TSP), indicates that the touch driving circuit (ROIC) drives the touch panel (TSP) (i.e., supplies a touch driving signal (TDS) to touch electrodes (TE) disposed in the touch panel (TSP)) and receives a sensing signal (SS) from the touch panel (TSP). Therefore, the touch sensing processing may include touch driving processing, touch sensing signal reception processing, or the like.

Referring to FIG. 4, the touch panel (TSP) may include Q*R touch electrodes (TEs), and the sensing converter (SCB) may include a first switch (MUX1), a sensing unit block (SUB) including Q sensing units (SU #1, SU #2, . . . , and SU #Q), a second switch (MUX2), at least one analog-digital converter (ADC), and the like.

Each sensing unit (SU) may include a pre-amplifier (pre-AMP), an integrator, a sample-and-hold circuit (SHA), and the like.

The pre-amplifier may output an input touch driving signal (TDS) to a corresponding touch electrode (TE) of the touch panel (TSP), via the first switch (MUX1).

The first switch (MUX1) may be a circuit for performing R:1 multiplexing, and includes at least one multiplexer.

The touch driving signal (TDS) is output to a touch electrode (TE) corresponding to a corresponding touch channel via the first switch (MUX1) using the pre-amplifier.

In the touch mode, the capacitance of a touch electrode (TE) to which a touch driving signal (TDS) is provided via the pre-amplifier may be changed due to a touch object such as a finger or a pen. The change in the capacitance may be accumulated, as the change in voltage, in the integrator using the pre-amplifier.

Also, in the pen data mode, in response to a touch driving signal (TDS), a pen data signal corresponding to each bit of pen data output from the active pen (ACP) is received and is transferred to the pre-amplifier.

In association with the above, the first switch (MUX1) is a circuit for performing R:1 multiplexing, and may include at least one multiplexer. The first switch (MUX1) may select Q or more signals from among signals (sensing signals) received from Q*R touch electrodes (TEs) according to the control of the timing generator (TG).

The selected sensing signals may be transferred to the Q sensing units (SU #1, SU #2, . . . , and SU #Q) in the sensing unit block (SUB), and may be input to the integrator via the pre-amplifier.

The integrator may output an integral value of an output voltage of the pre-amplifier (Pre-AMP) (i.e., a sensing signal output to an output terminal of the pre-amplifier (Pre-AMP)).

The sample-and-hold circuit (SHA), which is a circuit added to an input end of the analog-digital converter (ADC), samples and holds an input voltage, and maintains the held voltage as it is until the analog-digital converter (ADC) finishes conversion. The voltage stored (held) in the sample-and-hold circuit (SHA) corresponds to a touch sensing signal.

The second switch (MUX2) is a circuit for Q:1 multiplexing, and includes at least one multiplexer. The second switch (MUX2) may select one of Q sensing units (SU #1, SU #2, . . . , and SU #Q) of the sensing converter (SCB), and may input the voltage held in the sample-and-hold circuit (SHA) of the selected sensing unit to the analog-digital converter (ADC).

The analog-digital-converter (ADC) converts an input voltage to a digital sensing value, and outputs sensing data.

Here, the analog-digital converter (ADC) converts the voltage held in the sample-and-hold circuit (SHA) into sensing data (SD) including a predetermined number of bits, which is designated in advance according to a predetermined resolution, and may output the same.

For example, the analog-digital converter (ADC) may output 8-bit sensing data.

The timing generator (TG) may control the elements of the touch driving circuit (ROIC), based on a touch synchronization signal (Tsync) transmitted from the touch controller (TCR). In a touch period (TP) defined by a touch synchronization signal (Tsync), the timing generator (TG) may receive a touch driving signal (TDS) and may transfer the same to the sensing converter (SCB).

The timing generator (TG) may control the first switch (MUX1), so as to select a predetermined number of touch electrodes (TEs) from among Q*R touch electrodes (TEs).

In this instance, the timing generator (TG) may control the number of touch electrodes (TEs) to be selected. The timing generator (TG) may control the number of touch electrodes (TEs), based on a detailed operation mode.

For example, the timing generator (TG) may control the first switch (MUX1) such that Q touch electrodes (TEs) are selected in the touch mode or the pen position mode, and Q*2 touch electrodes (TEs) are selected in the pen data mode.

Also, the timing generator (TG) may control the second switch (MUX2), so as to select a sensing unit for transmitting a sensing signal to the analog-digital converter (ADC), from among Q sensing units (SU #1, SU #2, . . . , and SU #Q).

In this instance, the second switch (MUX2) may select sensing units, the number of which corresponds to the number of analog-digital converters (ADCs), from among the Q sensing units (SU #1, SU #2, . . . , and SU #Q).

Here, it is assumed that a single analog-digital converter (ADC) is included in the sensing converter (SCB).

The timing generator (TG) may control the start of the operation of the analog-digital converter (ADC), and when a conversion completion signal is received from the analog-digital converter (ADC), may receive sensing data (SD) that is converted into a digital value.

The timing generator (TG) sequentially stores sensing data (SD) received in the touch mode or the pen position mode, in a designated location in the sensing buffer (SBUF).

Here, the designated location in the sensing buffer (SBUF) may indicate a location designated to correspond to the location of a touch electrode (TE).

The timing generator (TG) may generate summation sensing data by range-converting and merging two or more pieces of sensing data (SD) received in the pen-data mode, and may sequentially store the generated summation sensing data in a designated location in the sensing buffer (SBUF).

Here, the number of bits of the summation sensing data is less than or equal to the number of bits of each piece of sensing data.

Detailed descriptions of summation sensing data will be described later.

Additionally, when the amount of data of sensing data or summation sensing data stored in the sensing buffer (SBUF) reaches a predetermined amount of data, the timing generator (TG) may output an interrupt signal (IRQ) to the touch controller (TCR) via the slave interface (SCI).

The sensing buffer (SBUF) includes at least one buffer, and stores sensing data (SD) or summation sensing data output from the timing generator (TG).

The configuration register (CFGR) receives a configuration value of the touch driving circuit (ROIC) from the touch controller (TCR), stores the same, transmits the stored configuration value to the timing generator (TG), and sets the configuration for the operation of the timing generator (TG).

The slave interface (SCI) communicates with the touch controller (TCR) in a predetermined manner. For example, the communication scheme used between the slave interface (SCI) and the touch controller (TCR) may be a serial peripheral interface (SPI) scheme.

The serial peripheral interface (SPI) is an interface that operates in a full duplex mode and corresponds to a synchronous serial-data connection scheme, wherein the full duplex mode is a communication scheme in which a touch driving circuit (ROIC) and a touch controller (TCR) respectively use independent lines (signal lines) for transmitting and receiving data (signal, information) in parallel.

In the serial peripheral interface (SPI), the touch driving circuit (ROIC) and the touch controller (TCR) may communicate in a master-slave mode.

That is, the touch driving circuit (ROIC) corresponds to a slave, and the touch controller (TCR) corresponds to a master. Accordingly, an interface installed in the touch driving circuit (ROIC) may be a slave interface (SCI).

Referring to FIG. 4, a communication interface (CI) between the touch driving circuit (ROIC) and the touch controller (TCR) may include four lines, that is, a slave select signal line, a clock signal line, a master data output line, a slave data output line.

The slave select signal line is a line used when the touch controller (TCR) outputs a slave select signal (SSN) for selecting a touch driving circuit (ROIC) to perform touch sensing.

When the touch driving circuit (ROIC) is implemented as an integrated chip (IC), a slave select signal (SSN) may be also referred to as a chip select signal. In this instance, the slave select signal line may be also referred to as a chip select signal line.

The clock signal line is a line for transmitting a clock signal (SCLK) from the touch controller (TCR) to the touch driving circuit (ROIC).

The master data output line is a line for transmitting master data (MOSI) from the touch controller (TCR) to the touch driving circuit (ROIC).

The slave data output line is a line for transmitting slave data (MISO) from the touch driving circuit (ROIC) to the touch controller (TCR).

The touch controller (TCR) may synchronize master data (MOSI) with a clock signal (SCLK) transmitted via the clock signal line, and transmit the same via the master data output line.

Here, the master data (MOSI) may include, as write data, information (e.g., ADDR or CMD) required for communicating with the touch driving circuit (ROIC), information required for controlling operation of the touch driving circuit (ROIC), or the like. The master data (MOSI) may include at least one from among address information (memory address information (ADDR)) in a memory of the touch driving circuit (ROIC) or the touch controller (TCR), command information (CMD) including various types of control information or the like, write data corresponding to data to be written in the memory of the touch driving circuit (ROIC), and the like. The memory address information (ADDR) may be a memory address indicating the location where data (e.g., sensing data or the like) required by the touch controller (TCR) is stored in the sensing buffer (SBUF).

The command information (CMD) may include at least one from among information for controlling a touch driving circuit (ROIC), information required for the communication between the touch controller (TCR) and the touch driving circuit (ROIC), and the like.

Via the command information, the touch driving circuit (ROIC) may accurately perform operations required for touch driving and sensing, and the communication between the touch driving circuit (ROIC) and the touch controller (TCR) may be smoothly performed.

The touch driving circuit (ROIC) may synchronize slave data (MISO) with a clock signal (SCLK) transmitted via the clock signal line, and transmit the same via the slave data output line.

Here, the slave data (MISO) may include, as read data, sensing data, summation sensing data, or the like generated via touch driving by the touch driving circuit (ROIC).

As described above, the touch controller (TCR) may synchronize master data (MOSI) with a clock signal (SCLK) and may transmit the same, whereby the touch driving circuit (ROIC) may accurately read the master data (MOSI) transmitted from the touch controller (TCR). Also, the touch driving circuit (ROIC) synchronizes slave data (MISO) with a clock signal (SCLK), and transmits the same, whereby the touch controller (TCR) may accurately read the slave data (MISO) transmitted from the touch driving circuit (ROIC).

The touch controller (TCR) receives a touch synchronization signal (Tsync) of the touch display device 100, transfers the same to the touch driving circuit (ROIC), generates a touch driving signal (TDS), based on the touch synchronization signal (Tsync), and outputs the same to the touch driving circuit (ROIC).

The touch controller (TCR) includes a master interface (MCI), and communicates with a slave interface (SCI) of the touch driving circuit (ROIC).

The touch controller (TCR) transmits a slave select signal (SSN), a clock signal (SCLK), and master data (MOSI) to the touch driving circuit (ROIC), and receives slave data (MISO) from the touch driving circuit (ROIC).

The touch controller (TCR) receives sensing data (SD) as slave data (MISO), and may determine the location of a touch by a touch input pointer such as a finger, a pen, or the like.

Particularly, the touch controller (TCR) according to aspects of the present disclosure may receive summation sensing data in the pen data mode, and may determine each bit value of the pen data.

Figure 5:
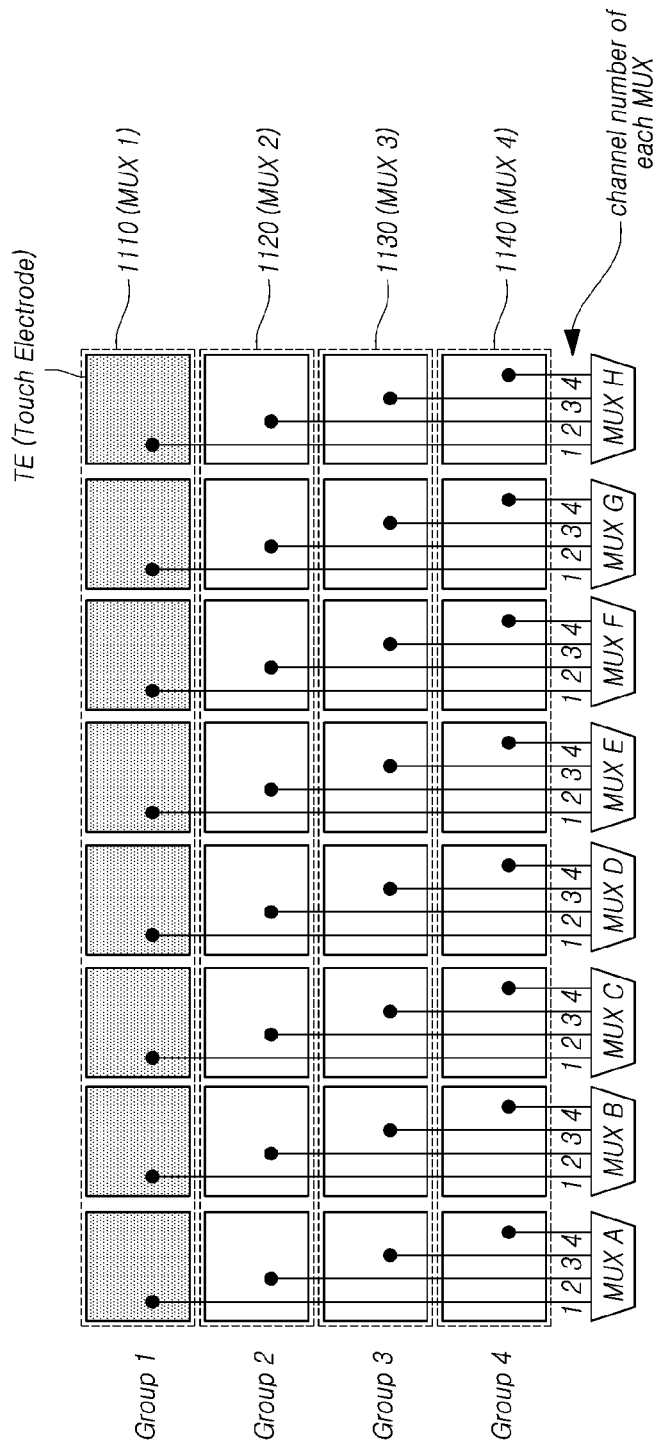
FIG. 5 is a diagram illustrating a scheme of selecting a touch electrode by a first switch according to aspects of the present disclosure.

FIG. 5 is a diagram illustrating a scheme of selecting a touch electrode by a first switch according to present aspects.

Referring to FIG. 5, it is assumed that a first switch (MUX1) includes 8 multiplexers (MUX A, MUX B, MUX C, MUX D, MUX E, MUX F, MUX G, and MUX H).

Each of the MUX A, MUX, B, MUX C, MUX D, MUX E, MUX F, MUX G, and MUX H may include four channels 1, 2, 3, and 4, wherein 1, 2, 3, and 4 indicate channel numbers.

Referring to FIG. 5, for example, a plurality of touch electrodes (TEs) may be grouped into a plurality of groups (Groups 1, 2, 3, and 4).

Group 1 1110 may include touch electrodes (touch electrodes that perform sensing in a MUX 1 driving period) that are sensed by a touch driving signal (TDS) output via channel 1 of each multiplexer.

Group 2 1120 may include touch electrodes (touch electrodes that perform sensing in a MUX 2 driving period) that are sensed by a touch driving signal (TDS) output via channel 2 of each multiplexer.

Group 3 1130 may include touch electrodes (touch electrodes that perform sensing in a MUX 3 driving period) that are sensed by a touch driving signal (TDS) output via channel 3 of each multiplexer.

Group 4 1140 may include touch electrodes (touch electrodes that perform sensing in a MUX 4 driving period) that are sensed by a touch driving signal (TDS) output via channel 4 of each multiplexer.

In FIG. 5, although it is described that a plurality of touch electrodes are selected by group, the first switch (MUX1) may select a plurality of groups at the same time, depending on a case.

For example, the first switch (MUX1) may select adjacent groups (e.g., a first group and a second group) at the same time in the pen data mode.

Figure 6:
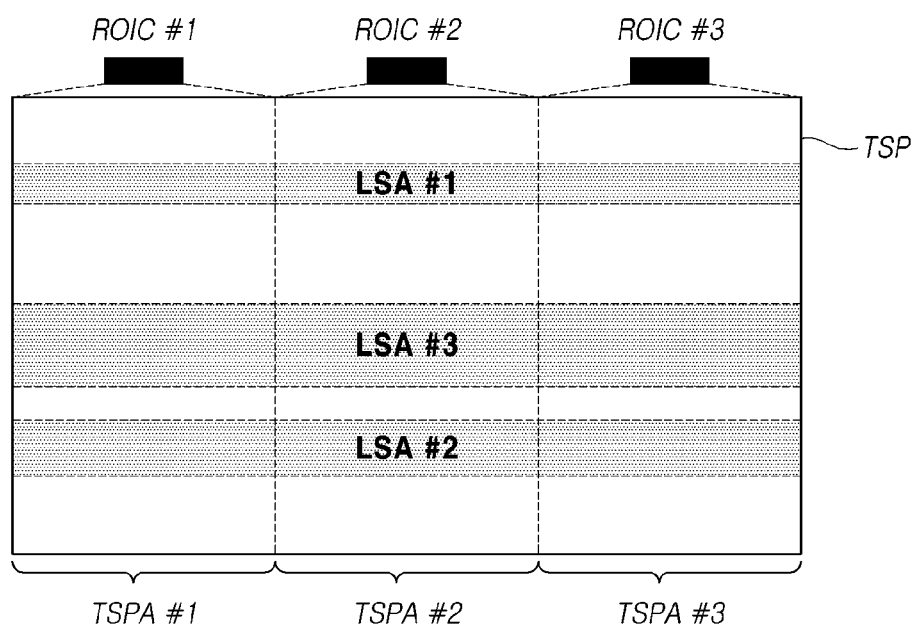
FIGS. 6 and 7 are diagrams illustrating the concept of local sensing by a touch circuit according to aspects of the present disclosure.
Figure 7:
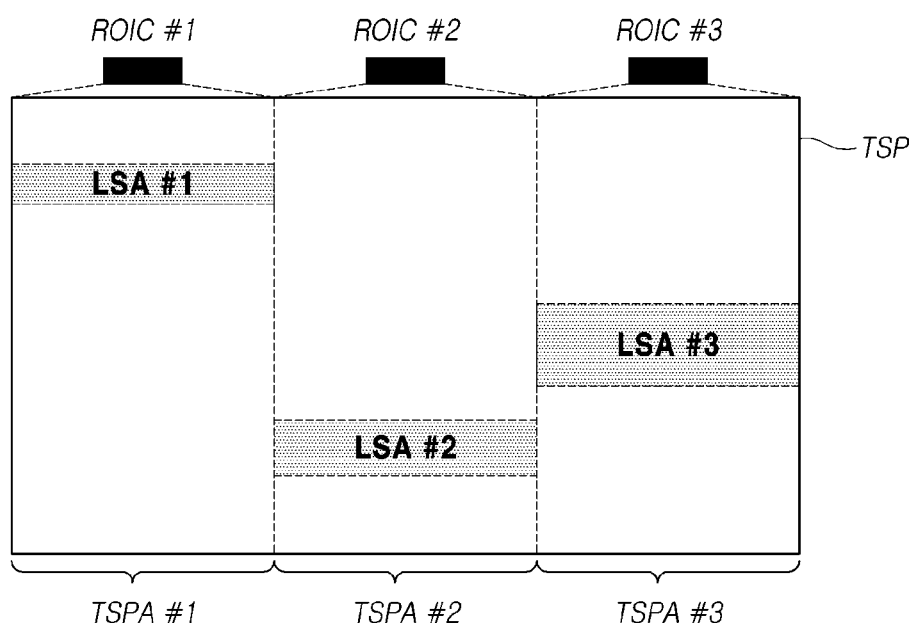

FIGS. 6 and 7 are diagrams illustrating the concept of local sensing by a touch circuit according to various aspects of the present disclosure.

A touch circuit (TC) according to aspects of the present disclosure may sense a touch by a finger and/or an active pen only within a partial area of a touch panel (TSP).

The operation in which the touch circuit (TC) senses a touch by a finger and/or an active pen in a partial area of the touch panel (TSP) is referred to as local sensing.

In the touch panel (TSP), the area where the local sensing is performed is referred to as a local sensing area (LSA).

The number of local sensing areas (LSAs) is more than one.

When local sensing is performed, the touch circuit (TC) may perform pen recognition processing (pen data sensing processing) in a local sensing area (LSA) corresponding to a partial area of the entire area of the touch panel (TSP).

According to a driving method when local sensing is performed, the touch circuit (TC) supplies a driving signal to only touch electrodes disposed in a local sensing area (LSA) from among touch electrodes disposed in the touch panel (TSP), and detects a signal via the touch electrodes disposed in the local sensing area (LSA) so as to perform sensing processing (touch sensing processing or pen data sensing processing).

In some cases, when local sensing is performed, the touch circuit (TC) supplies a driving signal to all touch electrodes disposed in the touch panel (TSP), and instead, detects a signal via only touch electrodes disposed in a local sensing area (LSA) so as to perform sensing processing (touch sensing processing or pen touch sensing processing).

The touch circuit (TC) may perform local sensing in two or more local sensing areas, and may change the size of at least one of the two or more local sensing areas.

That is, the location or the size of a local sensing area (LSA) may be variable.

As illustrated in FIGS. 6 and 7, a description will be provided by assuming the case in which three touch driving circuits (ROIC #1, ROIC #2, and ROIC #3) drive the touch panel (TSP).

The first touch driving circuit (ROIC #1) may control a first touch panel area (TSPA #1) of the touch panel (TSP).

That is, the first touch driving circuit (ROIC #1) may drive touch electrodes disposed in the first touch panel area (TSPA #1) of the touch panel (TSP), and may detect a signal from the touch electrodes disposed in the first touch panel area (TSPA #1) of the touch panel (TSP).

The second touch driving circuit (ROIC #2) may control a second touch panel area (TSPA #2) of the touch panel (TSP).

That is, the second touch driving circuit (ROIC #2) may drive touch electrodes disposed in the second touch panel area (TSPA #2) of the touch panel (TSP), and may detect a signal from the touch electrodes disposed in the second touch panel area (TSPA #2) of the touch panel (TSP).

The third touch driving circuit (ROIC #3) may control a third touch panel area (TSPA #3) of the touch panel (TSP).

That is, the third touch driving circuit (ROIC #3) may drive touch electrodes disposed in the third touch panel area (TSPA #3) of the touch panel (TSP), and may detect a signal from the touch electrodes disposed in the third touch panel area (TSPA #3) of the touch panel (TSP).

As illustrated in FIG. 6, local sensing areas where the three touch driving circuits (ROIC #1, ROIC #2, and ROIC #3) perform driving and signal detection for local sensing exist in common in all touch panel areas (TSP #1, TSPA #2, and TSPA #3, the entire area of the touch panel (TSP)).

Particularly, the first touch driving circuit (ROIC #1) may perform driving and signal detection in a first local sensing area (LSA #1) that exists throughout the entire area of the touch panel (TSP).

The second touch driving circuit (ROIC #2) may perform driving and signal detection in a second local sensing area (LSA #2) that exists throughout the entire area of the touch panel (TSP).

The third touch driving circuit (ROIC #3) may perform driving and signal detection in a third local sensing area (LSA #3) that exists throughout the entire area of the touch panel (TSP).

As illustrated in FIG. 7, local sensing areas where three touch driving circuits (ROIC #1, ROIC #2, and ROIC #3) respectively perform driving and signal detection for local sensing may exist in their corresponding touch panel areas.

Particularly, the first touch driving circuit (ROIC #1) may perform driving and signal detection in the first local sensing area (LSA #1) in the first touch panel area (TSPA #1).

The second touch driving circuit (ROIC #2) may perform driving and signal detection in the second local sensing area (LSA #2) in the second touch panel area (TSPA #2).

The third touch driving circuit (ROIC #3) may perform driving and signal detection in the third local sensing area (LSA #3) in the third touch panel area (TSPA #3).

As illustrated in FIG. 7, the three local sensing region (LSA #1, LSA #2, LSA #3) where each of the three touch driving circuits (ROIC #1, ROIC #2, ROIC #3) performs driving and signal detection for local sensing may exist in each of the three touch panel regions (TSPA #1, TSPA #2, TSPA #3).

Particularly, the first touch driving circuit (ROIC #1) may perform driving and signal detection in a first local sensing area (LSA #1) that exists in the first touch panel regions (TSPA #1) of the touch panel (TSP).

The second touch driving circuit (ROIC #2) may perform driving and signal detection in a second local sensing area (LSA #2) that exists in the second touch panel regions (TSPA #2) of the touch panel (TSP).

The third touch driving circuit (ROIC #3) may perform driving and signal detection in a third local sensing area (LSA #3) that exists in the third touch panel regions (TSPA #3) of the touch panel (TSP).

Figure 8:
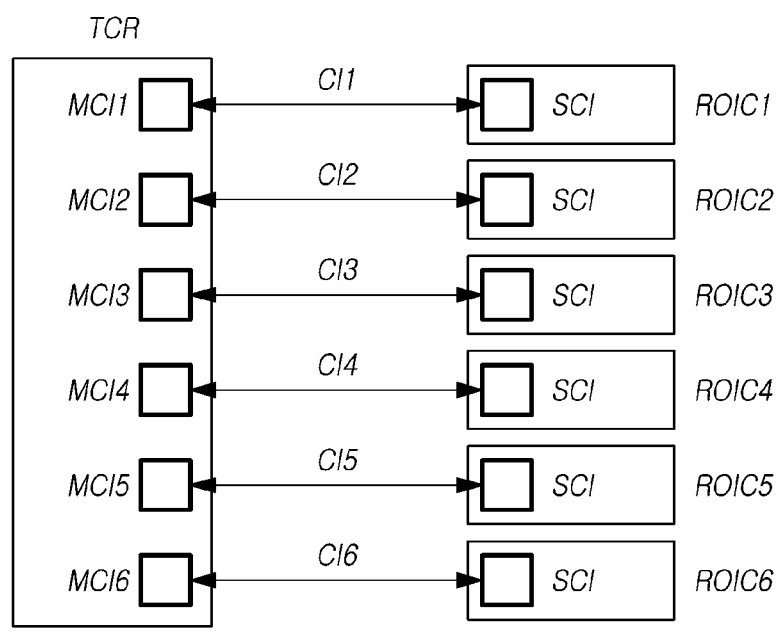
FIG. 8 is a diagram illustrating an example of a communication interface between a touch controller and a touch driving circuit according to aspects of the present disclosure.
Figure 9:
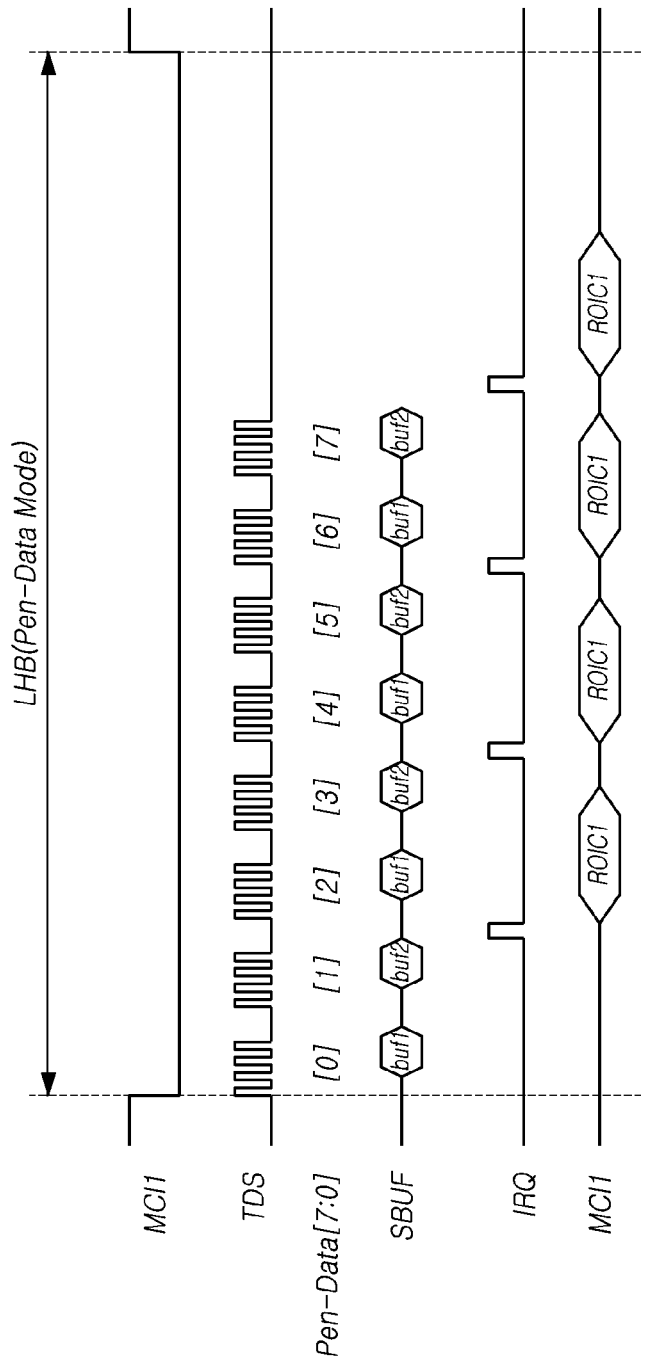
FIG. 9 is a diagram illustrating an example of slave data transmitted via the communication interface of FIG. 8.

FIG. 8 illustrates an example of a communication interface between a touch controller and a touch driving circuit according to aspects of the present disclosure. FIG. 9 illustrates an example of slave data transmitted via the communication interface of FIG. 8. FIG. 10 illustrates sensing data stored in a buffer of a sensing buffer.

FIG. 8 illustrates the case in which a touch circuit (TC) includes 6 touch driving circuits (ROICs), and a touch controller (TCR) includes 6 master interfaces (MICs).

The touch circuit (TC) may include a plurality of touch driving circuits (ROICs) according to the size and resolution of the touch display device 100. Each of the plurality of touch driving circuits (ROICs) may include a slave interface (SCI) for performing communication with the touch controller (TCR).

The touch controller (TCR) may include a plurality of master interfaces (MCIs) corresponding to the plurality of touch driving circuits (ROICs). That is, the touch controller (TCR) may include master interfaces (MCIs), the number of which corresponds to the number of touch driving circuits (ROICs).

In this instance, as illustrated in FIG. 8, a slave interfaces (SCIs) in each of the plurality of touch driving circuits (ROICs) may perform master-slave communication via a communication interface (CI) that corresponds to a corresponding master interface (MCI) in the touch controller (TCR).

That is, each of the slave interfaces (SCIs) in the plurality of touch driving circuits (ROICs) occupies and uses a corresponding communication interface (CI) and a corresponding master interface (MCI), whereby communication may be reliably performed.

FIG. 9 is a diagram illustrating a timing at which sensing data is transmitted to a touch controller (TCR), as slave data in the pen data mode.

The operation of the timing diagram of FIG. 9 will be described with reference to FIG. 10. First, a plurality of touch driving signals (TDSs) are transmitted to a plurality of touch electrodes (TEs).

Here, the touch driving signal (TDS) is a signal for receiving pen data from an active pen (ACP), and is output separately such that the pen data is received by each bit.

In FIG. 9, 8 touch driving signals are separately output in an LHB corresponding to a single touch period (TP), in order to receive 8-bit pen data. The separately output touch driving signals (TDSs) are signals provided by toggling a predetermined number of times at a designated frequency.

In this instance, as illustrated in FIG. 7, the first switch (MUX1) of the touch driving circuit (ROIC) may output a touch driving signal (TDS) to a plurality of touch electrodes (TEs) disposed in a location corresponding to the position of a pen, which has been determined in the pen position mode that was previously performed. That is, local sensing may be performed.

Here, for example, as illustrated in FIG. 5, it is assumed that the first switch (MUX1) of the touch driving circuit (ROIC) has 8 multiplexers that drives 8 touch electrode columns, and four groups are included in a local sensing area (LSA).

The first switch (MUX1) may select the 8 touch electrodes included in one group, at the same time.

The first switch (MUX1) may switch four times such that four groups are selected within the period of each separately output touch driving signal (TDS).

The active pen (ACP) outputs pen data in units of bits in response to a touch driving signal (TDS). The active pen (ACP) outputs a pen data signal corresponding to each bit of the pen data.

Therefore, the active pen (ACP) may output an 8-bit pen data signal in response to a touch driving signal (TDS) in an LHB in the pen data mode.

The first switch (MUX1) performs switching such that the four groups are selected, one group for each time, during the period of each separately output touch driving signal (TDS). Accordingly, the sensing converter (SCB) may receive sensing signals (SSs) from 32 touch electrodes (8*4=32) within the period of a single touch driving signal (TDS).

The received sensing signal (SS) is converted into sensing data (SD) via an analog-digital converter (ADC), and may be transmitted to the timing generator (TG).

The analog-digital converter (ADC) may output 8-bit sensing data (SD). This may indicate that a sensing signal detected from a selected touch electrode, with respect to one bit of pen data output from the active pen (ACP), is converted into 8-bit sensing data.

That is, the analog-digital converter (ADC) may generate and output 8-bit sensing data (SD) with respect to one bit of the pen data, for each touch electrode.

Here, the output 8-bit sensing data (SD) is a value corresponding to the bit value of one bit of the pen data.

For example, when the bit value of the pen data is output as 0, sensing data (SD) may be output as an 8-bit sensing data such as 00000110, based on noise and the distance between the active pen (ACP) and a touch electrode (TE).

Also, when the bit value of the pen data is output as 1, sensing data (SD) may be output as an 8-bit sensing data such as 11010101.

The timing generator (TG), as illustrated in FIG. 10, stores received sensing data (SD) in a location in at least one buffer (buf1) of the sensing buffer (SBUF), the location corresponding to the location of a touch electrode in the local sensing area (LSA).

In FIG. 10, each block of a buffer (buf1) indicates a storage space having a size of 8 bits, where 8-bit sensing data (SD) may be stored. The number in each block indicates, in a manner of matrix notation, the disposition location of a corresponding touch electrode from among a plurality of touch electrodes (TEs) included in a local sensing area (LSA).

Although FIG. 10 illustrates only a single buffer (buf1), the sensing buffer (SBUF) may include two or more buffers. Here, it is assumed that the sensing buffer (SBUF) includes two buffers, that is, a first buffer (buf1) and a second buffer (buf2).

When the amount of data of sensing data (SD) stored in the sensing buffer (SBUF) reaches a predetermined amount of data, the timing generator (TG) may output an interrupt signal (IRQ) to the touch controller (TCR) via a slave interface (SCI).

Here, the interrupt signal (IRQ) is transmitted in order to prevent the amount of sensing data (SD) stored in the sensing buffer (SBUF) from exceeding the capacity of memory of the sensing buffer (SBUF).

In the case in which the sensing buffer (SBUF) includes two buffers (buf1 and buf2) in the size illustrated in FIG. 10, when sensing data (SD) corresponding to two touch driving signals (TDSs) is stored in the sensing buffer (SBUF) as illustrated in FIG. 9, the timing generator (TG) may output an interrupt signal (IRQ).

That is, a total of four interrupt signals (IRQs) are output during the LHB in the pen data mode, and a plurality of pieces of sensing data (SD) stored in the sensing buffer (SBUF) may be transmitted to the touch controller (TCR) four times.

In this instance, from among a plurality of master interfaces (MCI1 to MCI6) of the touch controller (TCR), a corresponding master interface (MCI1) receives only sensing data (SD) output from a predetermined touch driving circuit (ROIC1).

When an interrupt signal (IRQ) is received via a master interface (MCI), the touch controller (TCR) may receive sensing data (SD) stored in the first buffer (buf1) and the second buffer (buf2) as slave data (MISO).

The touch controller (TCR) analyzes a plurality of pieces of received sensing data (SD) so as to determine each bit value of the pen data.

A plurality of pieces of sensing data (SD) obtained via a plurality of touch electrodes may have different values. However, the plurality of touch electrodes (TEs) in a local sensing area (LSA) are disposed close to each other, and thus, the touch controller (TCR) may analyze the values of the plurality of pieces of sensing data (SD) according to the disposition locations of the touch electrodes (TEs), thereby determining the bit value of the pen data output from the active pen (ACP).

Figure 11:
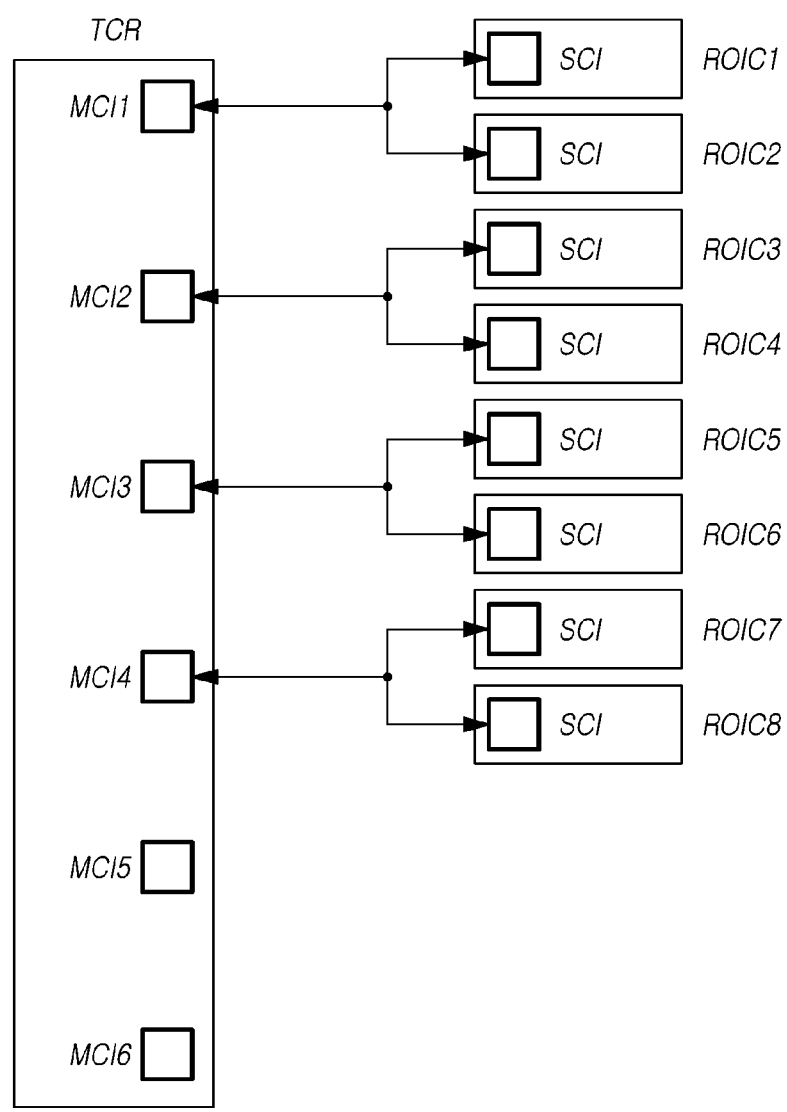
FIG. 11 is a diagram illustrating another example of a communication interface between a touch controller and a touch driving circuit according to aspects of the present disclosure.

FIG. 11 is a diagram illustrating another example of a communication interface between a touch controller and a touch driving circuit according to aspects of the present disclosure.

Recently, the number of touch electrodes (TEs) required increases as the size and the resolution of the touch display device 100 increases. Accordingly, the number of touch driving circuits (ROICs) required also increases.

Particularly, in the case in which a touch driving circuit (ROIC) and a data driving circuit (SDIC) that drives data lines are implemented as an integrated driving chip (SRIC), a larger number of touch driving circuits (ROICs) are included in the touch display device 100 even though only the resolution of the touch display device 100 increases, irrespective of the size of the touch display device 100.

FIG. 11 illustrates the case in which the number of touch driving circuits (ROICs) increases to 8.

In this instance, the touch controller (TCR) needs to additionally include master interfaces of which the number corresponds to the number of touch driving circuits (ROIC) that are added.

In order to increase the number of master interfaces of the touch controller (TCR), redesigning may need to be performed, which causes an increase in costs and a decrease in productivity.

Also, that may not allow application to the touch display device 100 with various resolutions and sizes.

Accordingly, FIG. 11 configures a communication interface such that two touch driving circuits ((ROIC1, ROIC2), (ROIC3, ROIC4), (ROIC5, SRIC6), (ROIC7, ROIC8)) among the 8 touch driving circuits share one master interface (MCI1 to MCI4).

As illustrated in FIG. 11, when it is configured that slave interfaces (SCIs) of two touch driving circuits (ROIC1 to ROIC8) share one master interface (MCI1 to MCI4) of the touch controller (TCR), communication with the 8 touch driving circuits (ROIC1 to ROIC8) may be allowed without changing the design of the touch controller (TCR). In addition, comparing with FIG. 8, it is recognized that communication with a larger number of touch driving circuits (ROIC1 to ROIC8) is allowed using a smaller number of master interfaces (MCI1 to MCI4).

However, when it is configured that a large number of touch driving circuits ((ROIC1, ROIC2), (ROIC3, ROIC4), (ROIC5, ROIC6), (ROIC7, ROIC8)) share a master interface (MCI1 to MCI4) of the touch controller (TCR), the touch driving circuits that share the master interface (MCI1 to MCI4) may alternately use the shared master interface (MCI1 to MCI4), and thus, a data transmission bandwidth allowed to be used may be reduced. That is, a communication speed may deteriorate, which is a drawback. The deterioration in the communication speed may cause a communication error due to an insufficient data transmission time.

Therefore, in aspects of the present disclosure, each touch driving circuit (ROIC) merges sensing data associated with pen data in the pen data mode, and outputs, to the touch controller (TCR), summation sensing data, the amount of data of which is decreased. Accordingly, deterioration in the communication speed and a communication error may be prevented.

Figure 12:
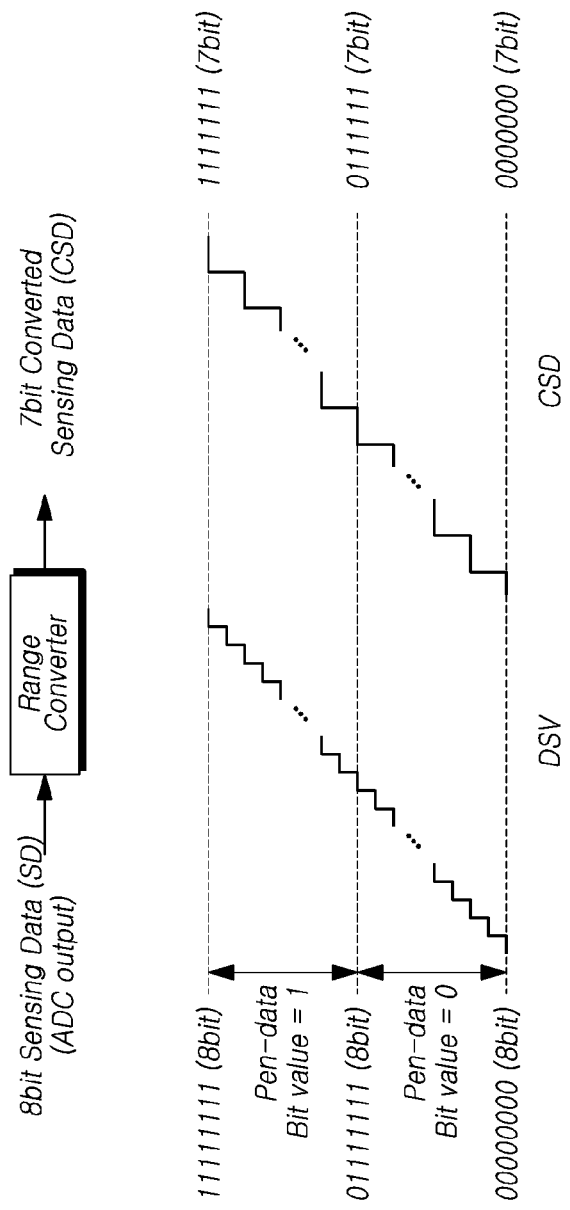
FIGS. 12 and 13 are diagrams illustrating the concept of generating summation sensing data according to aspects of the present disclosure.
Figure 13:
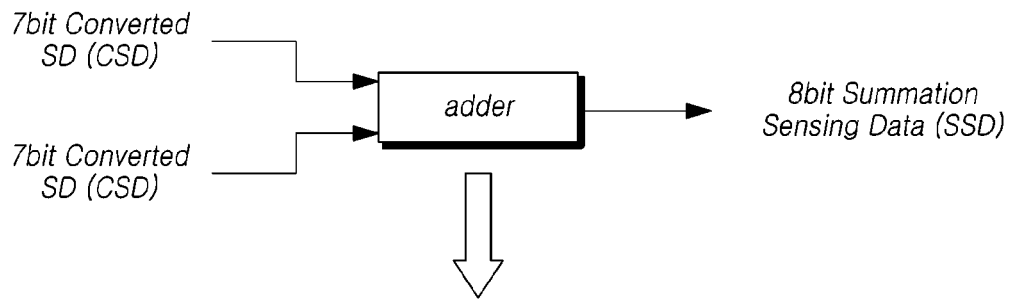

FIGS. 12 and 13 are diagrams illustrating the concept of generating summation sensing data according to aspects of the present disclosure.

Referring to FIG. 12, sensing data (SD) may be output from an analog-digital converter (ADC) as 8-bit data, as described above.

The 8-bit sensing data (SD) is data for determining a predetermined bit value of the pen data in the pen data mode. That is, the 8-bit sensing data (SD) is data for determining whether the bit value of the pen data is 0 or 1.

For example, as illustrated in FIG. 12, when the value of the 8-bit sensing data (SD) is less than or equal to a binary number "01111111", the touch controller (TCR) determines that the bit value of the pen data is 0. When the value of the 8-bit sensing data (SD) exceeds the binary number "01111111", the touch controller (TCR) determines that the bit value of the pen data is 1. That is merely a simple example. Actually, the touch controller (TCR) may set a range designated based on the binary number "01111111" as a margin range.

That is, lower bits in the 8-bit sensing data (SD) are bits to accurately express the size of the sensing signal (SD) which is an analog signal. That is, the lower bits are bits for increasing a range resolution.

Therefore, upper bits of the sensing data (SD) may actually affect when the bit value of the pen data is determined. Although one lower bit (LSB) is removed from the 8-bit sensing data (SD) and 7-bit range-converted sensing data (CSD) is obtained via range conversion, there is no difficulty in determining the bit value of the pen data.

That is, although the touch controller (TCR) receives converted sensing data (CSD) that excludes a predetermined lower bit of the sensing data (SD), the touch controller (TCR) may determine the bit value of the pen data.

In FIG. 12, a range converter may be implemented as a shift register or the like.

However, when a large number of lower bits are removed (e.g., 4 bits), a change in the range of the converted sensing data (CSD) is high and an error may occur.

Therefore, the touch driving circuit (ROIC) may not sufficiently reduce the amount of data to be transmitted to the touch controller (TCR) by simply removing lower bits.

Referring to FIG. 13, a touch driving circuit (ROIC) according to aspects of the present disclosure may merge two or more pieces of converted sensing data (CSD) so as to generate summation sensing data (SSD).

As described above, in aspects of the present disclosure, each of a plurality of touch electrodes (TEs) included in a local sensing area (LSA) may receive a pen data signal associated with the same bit value of pen data in the period of a touch driving signal (TDS).

The strength of sensing signals (SSs) detected via adjacent touch electrodes among the plurality of touch electrodes that receive the same pen data signal may be similar.

The strength of sensing signals (SSs) detected via touch electrodes that receive the same pen data signal may be different based on the noise and the distance between the active pen (ACP) and each touch electrode (TE), and the difference in the distances and noises between the touch electrodes (TEs) disposed close to each other may be low.

Accordingly, a touch driving circuit (ROIC) according to aspects of the present disclosure generates summation sensing data (SSD) by merging converted sensing data (CSD) obtained by converting sensing data (SD) corresponding to touch electrodes (TEs) disposed close to each other.

Here, merger indicates the binary summation of converted sensing data.

The converted sensing data (CSD) is data, the number of bits of which is reduced from that of 8-bit sensing data (SD). Accordingly, even when two or more pieces of converted sensing data (CSD) are merged, the number of bits of the summation sensing data (SSD) may not exceed 8 bits which corresponds to the number of bits of the sensing data (SD).

As it is recognized from the two examples in FIG. 13, sensing data (SD) having similar data values are merged and thus, the data value of the summation sensing data (SSD) may have the value similar to the data value of each piece of sensing data (SD).

In other words, in binary arithmetic, the generation of converted sensing data (CSD) by removing one lower bit of sensing data (SD) may indicate division by 2. Merging two pieces of converted sensing data (CSD) may indicate addition of two pieces of converted sensing data (CSD), which has been obtained by division by 2.

Therefore, two pieces of sensing data (SD) are similar, the value of summation sensing data (SSD) may be calculated to be similar to each piece of sensing data (SD).

Therefore, the touch controller (TCR) may determine the bit value of pen data, based on the summation sensing data (SSD), in a similar manner as the case when the sensing data (SD) is received.

However, since a single piece of summation sensing data (SSD) having 8 bits or fewer is received, instead of two pieces of 8-bit sensing data (SD), ½ or less of a data transmission bandwidth may be required.

An operation of range-converting sensing data (SD) into converted sensing data (CSD), and generating summation sensing data (SSD) may be performed by a timing generator (TG).

Figure 15:
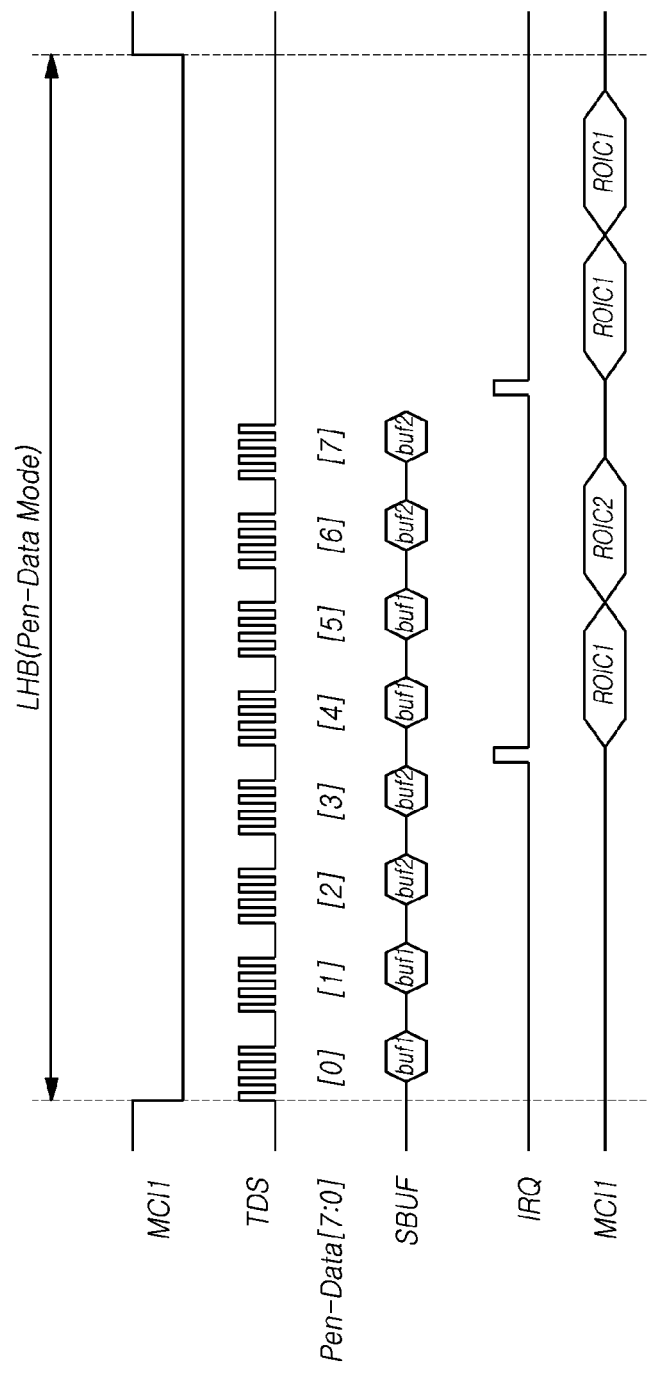
FIG. 15 is a diagram illustrating an example of slave data transmitted via the communication interface of FIG. 11.

FIG. 14 illustrates sensing data stored in a buffer of a sensing buffer. FIG. 15 illustrates an example of slave data transmitted via the communication interface of FIG. 11.

As described above, when a timing generator (TG) stores summation sensing data (SSD) instead of sensing data (SD), the amount of data stored in a sensing buffer (SBUF) is reduced by ½ when compared to FIG. 10. Hereinafter, the timing generator (TG) is also referred to as a touch generator.

Referring to FIG. 5, FIG. 14 assumes that summation sensing data (SSD) obtained by merging sensing data (SD) associated with touch electrodes in a first group and a second group, and summation sensing data (SSD) obtained by merging sensing data (SD) associated with touch electrodes in a third group and a fourth group are stored.

In the case in which the sensing buffer (SBUF) includes two buffers (buf1 and buf2), when sensing data (SD) corresponding to four touch driving signals (TDSs) are stored in the sensing buffer (SBUF) as illustrated in FIG. 15, the timing generator (TG) may output an interrupt signal (IRQ).

That is, a total of two interrupt signals (IRQs) are output during the LHB in the pen data mode, and a plurality of pieces of summation sensing data (SSD) stored in the sensing buffer (SBUF) may be transmitted two times to the touch controller (TCR). Comparing with FIG. 9, the period of time taken to perform communication may be reduced by ½.

Therefore, a corresponding master interface (MCI1) from among a plurality of master interfaces (MCI1 to MCI6) of the touch controller (TCR) receives summation sensing data (SSD) output from the touch driving circuit (ROIC1), and subsequently, receives summation sensing data (SSD) output from another touch driving circuit (ROIC2).

Accordingly, without changing the design of the touch controller (TCR), a plurality of touch driving circuits (ROIC1 to ROIC8) may reliably communicate with the touch controller (TCR).

Compared with the case of FIG. 8 in which 6 master interfaces (MCI1 to MCI6) are used, the amount of resources may be reduced in FIG. 11 since only four master interfaces (MCI1 to MCI4) are used. That is, extra master interfaces (MCI5 and MCI6) are not used and the amount of power consumed may be reduced, or the extra master interfaces may be used for other purposes.

Figure 16:
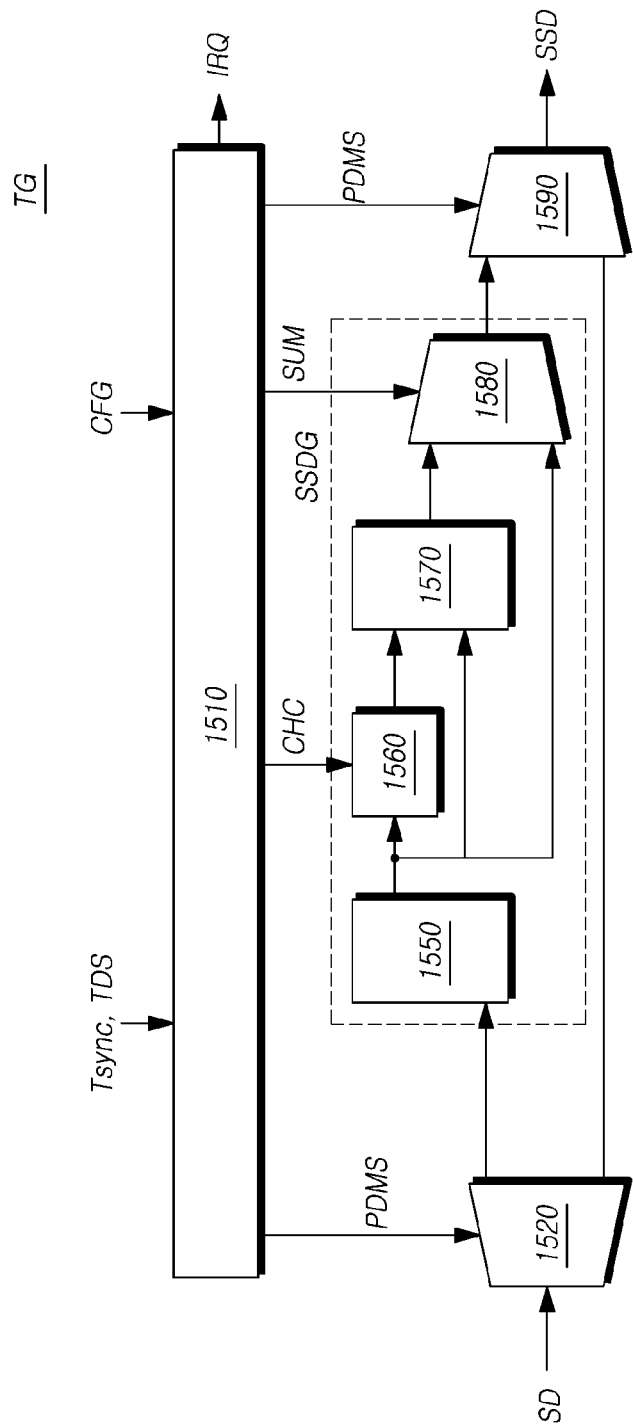
FIG. 16 is a diagram schematically illustrating the configuration of a timing generator according to aspects of the present disclosure.

FIG. 16 is a diagram schematically illustrating the configuration of a timing generator according to various aspects of the present disclosure.

FIG. 16 mainly illustrates the configuration of generating summation sensing data (SSD) in the timing generator (TG).

Referring to FIG. 16, the timing generator (TG) may include a range converter 1550, a channel delayer 1560, a data merger unit 1570, a summation data select switch 1580, and a merger controller 1510.

The range converter 1550 may range convert sensing data (SD) output from an analog-digital converter (ADC), and may output converted sensing data (CSD), as illustrated in FIG. 12.

That is, the converted sensing data (CSD) may be generated by removing a predetermined lower bit of the sensing data (SD).

The range converter 1550 may be implemented as, for example, a shift register.

The channel delayer 1560 may delay the converted sensing data, based on a channel counting value (CHC).

That is to merge converted sensing data (CSD) of touch electrodes in adjacent groups, as illustrated in FIG. 14.

For example, the channel delayer 1560 delays converted sensing data (CSD) associated with a touch electrode in a first group, such that the delayed converted sensing data (CSD) is transferred to the data merger unit 1570, together with converted sensing data (CSD) associated with a touch electrode in a second group.

The data merger unit 1570 may merge converted sensing data (CSD) output from the range converter 1550 and converted sensing data (CSD) delayed by the channel delayer 1560, so as to generate summation sensing data (SSD).

The data merger unit 1570 may be implemented as, for example, an adder that adds two pieces of converted sensing data (CSD) and outputs the same.

The summation data select switch 1580 may select one of the converted sensing data (CSD) output from the range converter 1550 and the summation sensing data (SSD) output from the data merger unit 1570, and may output the selected data, in response to a merger signal (SUM).

That is, converted sensing data (CSD) that has a reduced number of bits may be simply output, or summation sensing data (SSD) obtained by merging two or more pieces of converted sensing data (CSD) may be output, selectively.

In FIG. 16, the range converter 1550, the channel delayer 1560, the data merger unit 1570, and the summation data select switch 1580 may be referred to as summation sensing data generator (SSDG) that generates summation sensing data (SSD) from two or more pieces of sensing data (SD).

The merger controller 1510 may control the summation sensing data generator (SSDG) according to a configuration value (CFG) stored in a configuration register (CFGR), so as to generate summation sensing data (SSD).

Also, the timing generator (TG) may further include two sensing data select switches 1520 and 1590.

The summation sensing data (SSD) may be applied in the touch mode or the pen position mode, but may be most effective in the pen data mode.

Therefore, in the modes other than pen data mode, a touch driving circuit (ROIC) may need to output sensing data (SD) as it is, to the touch controller (TCR).

Accordingly, two sensing data select switches 1520 and 1590 may enable the touch driving circuit (ROIC) to output sensing data (SD) or to output summation sensing data (SSD), based on a pen data mode signal (PDMS) output from the merger controller 1510.

In response to a pen data mode signal (PDMS), the first sensing data select switch 1520 may transmit sensing data (SD) to the summation sensing data generator (SSDG) in the pen data mode, and may transmit sensing data (SD) to the second sensing data select switch 1590 in a mode other than the pen data mode.

In response to a pen data mode signal (PDMS), the second sensing data select switch 1590 may receive summation sensing data (SSD) output from the summation sensing data generator (SSDG), and may output the same in the pen data mode, and may select sensing data (SD) output from the first sensing data select switch 1520 and may output the same in a mode other than the pen data mode.

Therefore, the touch driving circuit (ROIC) of the present disclosure may selectively output sensing data (SD), summation sensing data (SSD) including a reduced amount of data, and converted sensing data (CSD).

Figure 17:
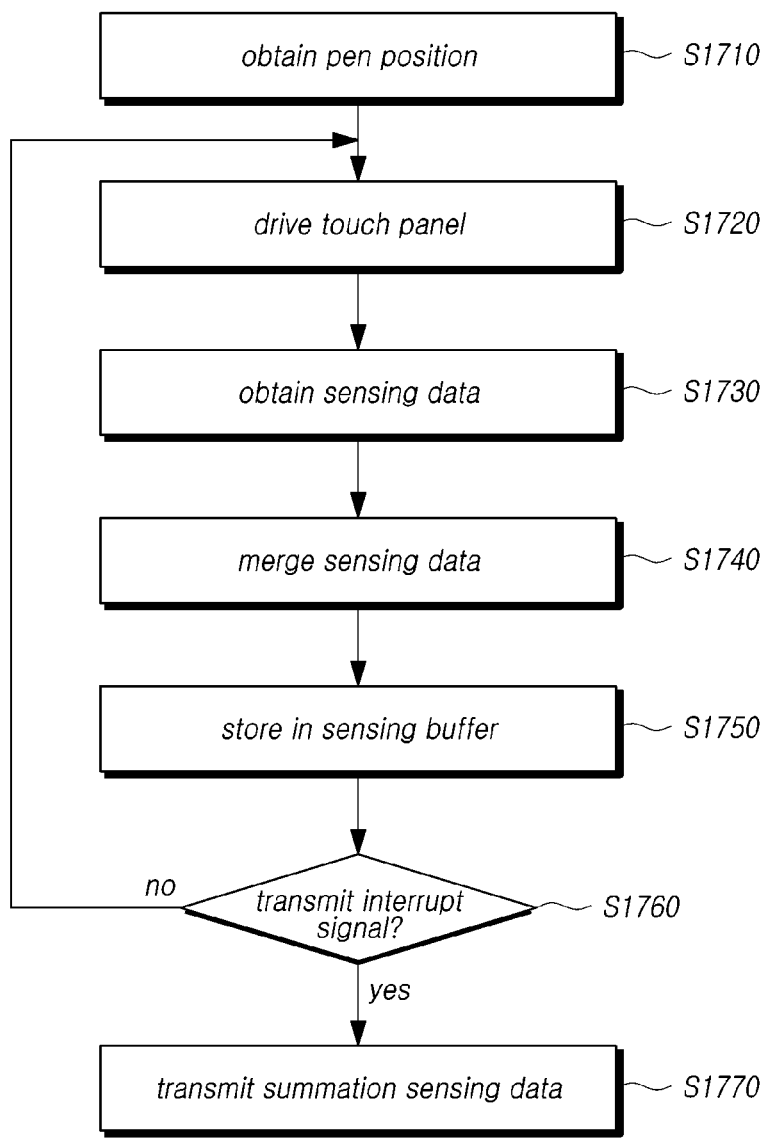
FIG. 17 is a diagram illustrating a pen data recognition method by a touch circuit according to aspects of the present disclosure.

FIG. 17 is a diagram illustrating a pen data recognition method by a touch circuit according to aspects of the present disclosure.

Referring to FIG. 17, in operation S1710, a pen data recognition method obtains the position of an active pen (ACP), which has been determined in the pen position mode performed before the pen data mode.

The method sets a local sensing area (LSA) corresponding to the position of the active pen (ACP), selects a plurality of touch electrodes (TEs) included in the set local sensing area (LSA), and supplies a touch driving signal (TSD) so as to perform driving, in operation S1720.

The method converts, into a digital signal, a sensing signal (SS) detected via a touch electrode selected by the active pen (ACP) in response to the touch driving signal (TDS), and obtains sensing data (SD) in operation S1730.

A touch generator (TG) performs range conversion by removing a predetermined lower bit of each of two or more pieces of sensing data (SD) correspond to touch electrodes disposed close to each other from among a plurality of pieces of sensing data (SD), which are obtained by detecting pen data of same bit value, thereby generating converted sensing data (CSD).

Also, the touch generator (TG) generates summation sensing data (SSD) by merging two or more pieces of generated converted sensing data (CSD) in operation S1740.

The touch generator (TG) stores the generated summation sensing data (SSD) in a corresponding location in a sensing buffer (SBUF) in operation S1750.

The touch generator (TG) analyzes the amount of data of summation sensing data (SSD) stored in the sensing buffer (SBUF), and determines whether to transmit an interrupt signal (IRQ) in operation S1760.

When it is determined that the amount of data of the summation sensing data (SSD) stored in the sensing buffer (SBUF) reaches a predetermined amount of data, the touch generator (TG) may transmit an interrupt signal (IRQ) to the touch controller (TCR) via a slave interface (SCI).

When an interrupt signal (IRQ) is received, the touch controller (TCR) receives summation sensing data (SSD) stored in the sensing buffer (SBUF), analyzes the received summation sensing data (SSD), and determines each bit value of pen data.

Therefore, according to the pen data recognition method by the touch circuit of the aspects of the present disclosure, a touch driving circuit (ROIC) generates summation sensing data from two or more pieces of sensing data, and transmits the generated summation sensing data to the touch controller (TCR), whereby the amount of data transmitted may be reduced by ½ or less than ½.

Therefore, communication may be reliably performed even when the number of master interfaces (MCI1 to MCI6) becomes smaller than the number of touch driving circuits (ROICs) since the size and the resolution of the touch display device 100 are changed.

The above description and the accompanying drawings are merely provided as an example of the technical idea of the present disclosure, and those having ordinary knowledge in the technical field to which the present disclosure pertains will appreciate that various modifications and changes in form, such as combination, separation, substitution, and change of a configuration, may be made to the aspects described herein without departing from the essential features of the present disclosure. Therefore, the aspects disclosed in the present disclosure are intended not to limit but to describe the technical idea of the present disclosure, and thus do not limit the scope of the technical idea of the present disclosure. The scope of the present disclosure should be construed based on the appended claims, and all of the technical ideas included within the scope equivalent to the appended claims should be construed as being included within the scope of the present disclosure.

What is claimed is:

1. A touch display device, comprising:
   a touch panel on which a plurality of touch electrodes are disposed; and
   a touch circuit supplying a touch driving signal to two or more touch electrodes among the plurality of touch electrodes in a pen data mode, generating sensing data for recognizing pen data which is transmitted from an active pen via the two or more touch electrodes in response to the touch driving signal, and performing range conversion and merger of two or more pieces of sensing data generated by detecting the pen data of a same bit value, so as to generate summation sensing data,
   wherein the number of bits of the summation sensing data is less than or equal to the number of bits of each piece of sensing data in the two or more pieces of sensing data.

2. The touch display device of claim 1, wherein the sensing data is obtained by performing digital conversion of a sensing signal into data of a predetermined number of bits, wherein the sensing signal is generated by detecting, each bit of the pen data sequentially output from the active pen via the two or more touch electrodes in response to the touch driving signal, and
   the summation sensing data is generated by performing range conversion that removes a predetermined lower bit of each of the two or more pieces of sensing data as far as each bit value of the pen data is determined, and by merging the two or more pieces of range-converted sensing data.

3. The touch display device of claim 2, wherein the summation sensing data is generated by performing binary summation of the two or more pieces of range-converted sensing data.

4. The touch display device of claim 2, wherein the touch circuit includes:
   two or more touch driving circuits supplying the touch driving signal to the touch panel, and obtaining and outputting the summation sensing data; and
   a touch controller generating the touch driving signal, transmitting the touch driving signal to at least one touch driving circuit, determining a position of the active pen in a pen position mode that is executed before the pen data mode so as to transmit pen position data to the touch driving circuit, receiving the summation sensing data, and determining the pen data.

5. The touch display device of claim 4, wherein the touch driving circuit includes:
   a first switch including a plurality of first multiplexers for selecting two or more touch electrodes to which the touch driving signal is to be supplied among the plurality of touch electrodes;
   a sensing converter including a plurality of sensing units for supplying the touch driving signal to two or more touch electrodes selected by a corresponding first multiplexer among the plurality of first multiplexers, and detecting each bit of the pen data received via the touch electrodes to which the touch driving signal is supplied, so as to generate the sensing signal;
   a second switch including at least one second multiplexer for selecting at least one sensing unit among the plurality of sensing units;
   an AD converter including at least one analog-digital converter for converting the sensing signal received via the second switch into a digital signal, and for outputting the sensing data;
   a sensing buffer including at least one buffer that stores the summation sensing data;
   a timing generator controlling the first and second switches, based on the pen position data transmitted from the touch controller; controlling an operation timing of the AD converter; receiving the sensing data so as to generate the summation sensing data; and controlling a timing for outputting the summation sensing data; and
   a slave interface communicating with the touch controller in a designated manner according to control of the timing generator.

6. The touch display device of claim 5, wherein the timing generator includes:
   a range converter configured to range-convert the sensing data output from the AD converter, and to output the converted sensing data;
   a channel delayer configured to delay the converted sensing data, based on a channel counting value associated with a touch electrode from which the sensing data is detected;
   a data merger unit configured to merge converted sensing data output from the range converter and converted sensing data delayed by the channel delayer, and to output summation sensing data;
   a summation data select switch configured to select and output one from among converted sensing data output from the range converter and summation sensing data output from the data merger unit, in response to a merger signal; and
   a merger controller configured to output the merger signal, based on a configuration value stored in advance in the pen data mode.

7. The touch display device of claim 5, wherein the timing generator obtains the summation sensing data from sensing data associated with touch electrodes close to each other from among the two or more selected touch electrodes, and sequentially stores the obtained summation sensing data in a location in the sensing buffer, the location corresponding to locations of the touch electrodes; and
   controls the slave interface to output an interrupt signal when an amount of data of the stored summation sensing data is a predetermined amount of data transmission.

8. The touch display device of claim 7, wherein the touch controller includes:
   at least one master interface communicating with the slave interface; and
   the master interface receiving the summation sensing data stored in the sensing buffer when the interrupt signal is received.

9. The touch display device of claim 8, wherein each of the at least one master interface communicating with two or more slave interfaces when the number of the at least one master interface installed in the touch controller is smaller than the number of touch driving circuits.

10. A touch driving circuit, comprising:
    a sensing converter supplying a touch driving signal to two or more touch electrodes among a plurality of touch electrodes in a pen data mode, and generating sensing data for recognizing pen data transmitted from an active pen via the two or more touch electrodes in response to the touch driving signal; and a timing generator controlling the sensing converter, and generating summation sensing data by processing and merging two or more pieces of sensing data generated by detecting the pen data of a same bit value, wherein the number of bits of the summation sensing data is less than or equal to the number of bits of each piece of sensing data in the two or more pieces of sensing data.

11. The touch display device of claim 10, wherein the touch driving circuit includes:

a first switch including a plurality of first multiplexers for selecting two or more touch electrodes to which the touch driving signal is to be supplied among the plurality of touch electrodes;

a sensing converter including a plurality of sensing units for supplying the touch driving signal to two or more touch electrodes selected by a corresponding first multiplexer among the plurality of first multiplexers, and detecting each bit of the pen data received via the touch electrodes to which the touch driving signal is supplied, so as to generate the sensing signal;

a second switch including at least one second multiplexer for selecting at least one sensing unit among the plurality of sensing units;

an AD converter including at least one analog-digital converter for converting the sensing signal received via the second switch into a digital signal, and for outputting the sensing data;

a sensing buffer including at least one buffer that stores the summation sensing data;

a timing generator controlling the first and second switches, based on the pen position data transmitted from the touch controller; controlling an operation timing of the AD converter; receiving the sensing data so as to generate the summation sensing data; and controlling a timing for outputting the summation sensing data; and a slave interface communicating with the touch controller in a designated manner according to control of the timing generator.

12. The touch display device of claim 11, wherein the timing generator includes:

a range converter configured to range-convert the sensing data output from the AD converter, and to output the converted sensing data;

a channel delayer configured to delay the converted sensing data, based on a channel counting value associated with a touch electrode from which the sensing data is detected;

a data merger unit configured to merge converted sensing data output from the range converter and converted sensing data delayed by the channel delayer, and to output summation sensing data;

a summation data select switch configured to select and output one from among converted sensing data output from the range converter and summation sensing data output from the data merger unit, in response to a merger signal; and a merger controller configured to output the merger signal, based on a configuration value stored in advance in the pen data mode.

13. The touch display device of claim 11, wherein the timing generator obtains the summation sensing data from sensing data associated with touch electrodes close to each other from among the two or more selected touch electrodes, and sequentially stores the obtained summation sensing data in a location in the sensing buffer, the location corresponding to locations of the touch electrodes; and controls the slave interface to output an interrupt signal when an amount of data of the stored summation sensing data is a predetermined amount of data transmission.

14. The touch display device of claim 13, wherein the touch controller includes:

at least one master interface communicating with the slave interface; and the master interface receiving the summation sensing data stored in the sensing buffer when the interrupt signal is received.

15. The touch display device of claim 14, wherein each of the at least one master interface communicating with two or more slave interfaces when the number of the at least one master interface installed in the touch controller is smaller than the number of touch driving circuits.

16. A method of recognizing pen data by a touch circuit, comprising:

supplying a touch driving signal to two or more touch electrodes among a plurality of touch electrodes in a pen data mode, and performing driving;

generating sensing data for recognizing pen data transmitted from an active pen via the two or more touch electrodes in response to the touch driving signal;

generating summation sensing data by performing range-conversion and merger of two or more pieces of sensing data generated by detecting the pen data of a same bit value; and determining each bit value of the pen data, based on the summation sensing data, wherein the number of bits of the summation sensing data is less than or equal to the number of bits of each piece of sensing data in the two or more pieces of sensing data.

* * * * *